(12) United States Patent
Voit et al.

(10) Patent No.: US 7,813,332 B1
(45) Date of Patent: *Oct. 12, 2010

(54) VOICE CALL ALTERNATIVE ROUTING THROUGH PSTN AND INTERNET NETWORKS

(75) Inventors: Eric A. Voit, Baltimore, MD (US);
James E. Curry, Herndon, VA (US);
Robert D. Farris, Sterling, VA (US)

(73) Assignee: Verizon Services Corp., Ashburn, VA (US)

( * ) Notice: Subject to any disclaimer, the term of this patent is extended or adjusted under 35 U.S.C. 154(b) by 755 days.

This patent is subject to a terminal disclaimer.

(21) Appl. No.: 11/052,447

(22) Filed: Feb. 7, 2005

Related U.S. Application Data

(63) Continuation of application No. 08/821,027, filed on Mar. 19, 1997, now Pat. No. 6,870,827.

(51) Int. Cl.
*H04L 12/66* (2006.01)
*H04L 12/28* (2006.01)
*H04L 12/56* (2006.01)

(52) U.S. Cl. .................................. 370/352; 370/401

(58) Field of Classification Search .................. 370/352
See application file for complete search history.

(56) References Cited

U.S. PATENT DOCUMENTS

| | | | |
|---|---|---|---|
| 4,054,756 A | 10/1977 | Comella et al. | |
| 4,100,377 A | 7/1978 | Flanagan | |
| 4,191,860 A | 3/1980 | Weber | |

(Continued)

FOREIGN PATENT DOCUMENTS

EP    0235257    9/1987

(Continued)

OTHER PUBLICATIONS

Weisser et al. "*The Intelligence Network and Forward-Looking Technology*" IEEE Comm magazine, Dec. 1988, pp. 64-69.

(Continued)

*Primary Examiner*—William Trost, IV
*Assistant Examiner*—Andrew Chriss

(57) ABSTRACT

The advanced intelligent network (AIN) to determine routing of voice calls alternatively between the public switched telephone network (PSTN) and a data packet network, such as the Internet, in accordance with the quality of service existing in the data packet network at the times of call origination. The user's acceptable level of service may be predefined with a threshold quality level stored in the user's Call Processing Record (CPR) in the AIN Integrated Services Control Point (ISCP). On a per call basis, the caller linked to a first public switched network may indicate a preference to route through the Internet. This indication is recognized by the AIN system, in response to which the quality of service currently present on the Internet for completion of the call is measured. If the result exceeds the stored threshold, the call is setup and routed through the Internet to the switched network link to the destination party. If the quality of service on the Internet is not satisfactory, the call is alternatively routed through the PSTN, which may include an Interexchange Carrier link. The AIN system automatically controls the alternative routing of such calls.

18 Claims, 7 Drawing Sheets

U.S. PATENT DOCUMENTS

| | | |
|---|---|---|
| 4,201,891 A | 5/1980 | Lawrence et al. |
| 4,310,727 A | 1/1982 | Lawser |
| 4,313,035 A | 1/1982 | Jordon et al. |
| 4,313,036 A | 1/1982 | Jabara et al. |
| 4,371,751 A | 2/1983 | Matthews et al. |
| 4,371,752 A | 2/1983 | Matthews et al. |
| 4,375,097 A | 2/1983 | Ulug |
| 4,555,594 A | 11/1985 | Friedes et al. |
| 4,565,903 A | 1/1986 | Riley |
| 4,577,066 A | 3/1986 | Bimonte et al. |
| 4,585,906 A | 4/1986 | Matthews et al. |
| 4,602,129 A | 7/1986 | Matthews et al. |
| 4,609,778 A | 9/1986 | Franklin et al. |
| 4,611,094 A | 9/1986 | Asmuth et al. |
| 4,611,096 A | 9/1986 | Asmuth et al. |
| 4,625,081 A | 11/1986 | Lotito et al. |
| 4,630,262 A | 12/1986 | Callens et al. |
| 4,652,700 A | 3/1987 | Matthews et al. |
| 4,653,045 A | 3/1987 | Stanley et al. |
| 4,672,700 A | 6/1987 | Poncy |
| 4,679,190 A | 7/1987 | Dias et al. |
| 4,685,125 A | 8/1987 | Zave |
| 4,710,917 A | 12/1987 | Tompkins et al. |
| 4,713,806 A | 12/1987 | Oberlander et al. |
| 4,718,005 A | 1/1988 | Feigenbaum et al. |
| 4,730,071 A | 3/1988 | Schoenthal |
| 4,734,931 A | 3/1988 | Bourg et al. |
| 4,741,820 A | 5/1988 | Coughlin |
| 4,747,130 A | 5/1988 | Ho |
| 4,748,618 A | 5/1988 | Brown et al. |
| 4,765,924 A | 8/1988 | Inoue |
| 4,766,604 A | 8/1988 | Axberg |
| 4,771,425 A | 9/1988 | Baran et al. |
| 4,782,485 A | 11/1988 | Gollub |
| 4,788,718 A | 11/1988 | McNabb et al. |
| 4,790,003 A | 12/1988 | Kepley |
| 4,821,034 A | 4/1989 | Anderson et al. |
| 4,827,500 A | 5/1989 | Binkerd et al. |
| 4,865,763 A | 9/1989 | Inoue |
| 4,866,763 A | 9/1989 | Cooper et al. |
| 4,872,157 A | 10/1989 | Hemmady et al. |
| 4,872,159 A | 10/1989 | Hemmady et al. |
| 4,872,160 A | 10/1989 | Hemmady et al. |
| 4,872,197 A | 10/1989 | Pemmaraju |
| 4,875,206 A | 10/1989 | Nichols et al. |
| 4,877,949 A | 10/1989 | Danielson |
| 4,882,476 A | 11/1989 | White |
| 4,893,302 A | 1/1990 | Hemmady et al. |
| 4,894,824 A | 1/1990 | Hemmady et al. |
| 4,897,874 A | 1/1990 | Lidinsky et al. |
| 4,899,333 A | 2/1990 | Roediger |
| 4,899,373 A | 2/1990 | Lee et al. |
| 4,910,794 A | 3/1990 | Mahany |
| 4,916,691 A | 4/1990 | Goodman |
| 4,918,722 A | 4/1990 | Duehran et al. |
| 4,922,348 A | 5/1990 | Gillon et al. |
| 4,922,486 A | 5/1990 | Lidinsky et al. |
| 4,933,931 A | 6/1990 | Kokubo |
| 4,942,574 A | 7/1990 | Zelle |
| 4,958,341 A | 9/1990 | Hemmady et al. |
| 4,969,184 A | 11/1990 | Gordon et al. |
| 4,979,206 A | 12/1990 | Padden et al. |
| 4,996,707 A | 2/1991 | O'Malley et al. |
| D315,573 S | 3/1991 | Schultz |
| 5,008,906 A | 4/1991 | Reichwein |
| 5,008,926 A | 4/1991 | Misholi |
| 5,009,337 A | 4/1991 | Bimbi |
| 5,012,511 A | 4/1991 | Hanle et al. |
| 5,018,191 A | 5/1991 | Catron et al. |
| 5,019,699 A | 5/1991 | Koenck |
| 5,023,868 A | 6/1991 | Davidson |
| 5,025,254 A | 6/1991 | Hess |
| 5,029,196 A | 7/1991 | Morganstein |
| 5,029,199 A | 7/1991 | Jones et al. |
| 5,029,200 A | 7/1991 | Haas |
| 5,031,098 A | 7/1991 | Miller |
| 5,034,975 A | 7/1991 | Grimes |
| 5,052,020 A | 9/1991 | Koenck |
| 5,052,943 A | 10/1991 | Davis |
| 5,065,393 A | 11/1991 | Sibbitt et al. |
| 5,068,888 A | 11/1991 | Scherk et al. |
| 5,070,536 A | 12/1991 | Mahany |
| 5,098,877 A | 3/1992 | Coughlin |
| 5,107,492 A | 4/1992 | Roux et al. |
| 5,113,499 A | 5/1992 | Ankney et al. |
| 5,115,431 A | 5/1992 | Williams et al. |
| 5,115,495 A | 5/1992 | Tsuchiya et al. |
| 5,123,064 A | 6/1992 | Hacker |
| 5,134,647 A | 7/1992 | Pugh et al. |
| 5,144,282 A | 9/1992 | Sutterlin |
| 5,146,488 A | 9/1992 | Okada et al. |
| 5,146,491 A | 9/1992 | Silver et al. |
| 5,157,390 A | 10/1992 | Yoshie et al. |
| 5,157,662 A | 10/1992 | Tadamura et al. |
| 5,159,592 A | 10/1992 | Perkins |
| 5,159,624 A | 10/1992 | Makita |
| 5,163,080 A | 11/1992 | Amoroso |
| 5,164,938 A | 11/1992 | Jurkevich et al. |
| 5,180,232 A | 1/1993 | Chadma |
| 5,185,860 A | 2/1993 | Wu |
| 5,193,110 A | 3/1993 | Jones et al. |
| 5,195,085 A | 3/1993 | Bertsch et al. |
| 5,195,086 A | 3/1993 | Baumgartner et al. |
| 5,195,128 A | 3/1993 | Knitl |
| 5,195,183 A | 3/1993 | Miller |
| 5,199,062 A | 3/1993 | Von Meister |
| 5,200,993 A | 4/1993 | Wheeler et al. |
| 5,202,817 A | 4/1993 | Koenck |
| 5,202,825 A | 4/1993 | Miller |
| 5,204,894 A | 4/1993 | Darden |
| 5,206,901 A | 4/1993 | Harlow et al. |
| 5,208,848 A | 5/1993 | Pula |
| 5,215,011 A | 6/1993 | Monney |
| 5,216,233 A | 6/1993 | Main |
| 5,218,187 A | 6/1993 | Koenck |
| 5,218,188 A | 6/1993 | Hanson |
| 5,223,699 A | 6/1993 | Flynn et al. |
| 5,223,820 A | 6/1993 | Sutterlin |
| 5,225,071 A | 7/1993 | Coughlin |
| 5,226,075 A | 7/1993 | Funk et al. |
| 5,227,614 A | 7/1993 | Danielson |
| 5,231,492 A | 7/1993 | Dangi et al. |
| 5,235,317 A | 8/1993 | Sutterlin |
| 5,237,604 A | 8/1993 | Ryan |
| 5,241,588 A | 8/1993 | Babso et al. |
| 5,243,645 A | 9/1993 | Bissell et al. |
| 5,243,654 A | 9/1993 | Hunter |
| 5,247,571 A | 9/1993 | Kay et al. |
| 5,254,971 A | 10/1993 | Sutterlin |
| 5,260,986 A | 11/1993 | Pershan |
| 5,263,080 A | 11/1993 | Jones et al. |
| 5,265,155 A | 11/1993 | Castro |
| 5,272,749 A | 12/1993 | Masek |
| 5,274,696 A | 12/1993 | Perelman |
| 5,280,159 A | 1/1994 | Warner |
| 5,287,199 A | 2/1994 | Zoccolillo |
| 5,289,378 A | 2/1994 | Miller |
| 5,289,468 A | 2/1994 | Yoshida |
| 5,295,154 A | 3/1994 | Meier |
| 5,303,297 A | 4/1994 | Durrell et al. |
| 5,305,181 A | 4/1994 | Schultz |
| 5,308,966 A | 5/1994 | Danielson |
| 5,309,437 A | 5/1994 | Perlman et al. |
| 5,311,583 A | 5/1994 | Friedes et al. |

| | | | | | | |
|---|---|---|---|---|---|---|
| 5,313,053 A | | 5/1994 | Koenck | 5,450,411 A | 9/1995 | Heil |
| 5,317,566 A | * | 5/1994 | Joshi ........................ 370/238 | 5,452,287 A | 9/1995 | Hiller et al. |
| 5,317,691 A | | 5/1994 | Traeger | 5,452,289 A | 9/1995 | Sharma et al. |
| 5,318,719 A | | 6/1994 | Hughes | 5,452,297 A | 9/1995 | Hiller et al. |
| 5,322,991 A | | 6/1994 | Hanson | 5,452,350 A | 9/1995 | Reynolds et al. |
| 5,325,421 A | | 6/1994 | Hou et al. | 5,455,821 A | 10/1995 | Schaeffer et al. |
| 5,327,421 A | | 7/1994 | Hiller et al. | 5,457,629 A | 10/1995 | Miller |
| 5,327,486 A | | 7/1994 | Wolff et al. | 5,459,775 A | 10/1995 | Isono et al. |
| 5,329,520 A | | 7/1994 | Richardson | 5,461,611 A | 10/1995 | Drake et al. |
| 5,329,578 A | | 7/1994 | Brennan et al. | 5,463,677 A | 10/1995 | Bash et al. |
| 5,331,580 A | | 7/1994 | Miller | 5,465,207 A | 11/1995 | Boatwright |
| 5,333,266 A | | 7/1994 | Boaz | 5,466,170 A | 11/1995 | Pavek |
| 5,341,374 A | * | 8/1994 | Lewen et al. ................. 370/450 | 5,468,947 A | 11/1995 | Danielson |
| 5,345,446 A | | 9/1994 | Hiller et al. | 5,468,950 A | 11/1995 | Hanson |
| 5,346,611 A | | 9/1994 | Coughlin | 5,469,496 A | 11/1995 | Emery et al. |
| 5,347,633 A | | 9/1994 | Ashfield et al. | 5,469,497 A | 11/1995 | Pierce et al. |
| 5,349,497 A | | 9/1994 | Hanson | 5,469,500 A | 11/1995 | Satter et al. |
| 5,349,678 A | | 9/1994 | Morris | 5,473,608 A | 12/1995 | Gagne et al. |
| 5,351,286 A | | 9/1994 | Nici | 5,473,677 A | 12/1995 | D'Amato et al. |
| 5,353,331 A | | 10/1994 | Emery et al. | 5,475,732 A | 12/1995 | Pester, III |
| 5,359,185 A | | 10/1994 | Hanson | 5,475,737 A | 12/1995 | Garner et al. |
| 5,361,256 A | | 11/1994 | Doeringer et al. | 5,475,748 A | 12/1995 | Jones |
| 5,365,524 A | | 11/1994 | Hiller et al. | 5,475,817 A | 12/1995 | Waldo et al. |
| 5,365,546 A | | 11/1994 | Koenck | 5,477,531 A | 12/1995 | McKee et al. |
| 5,367,566 A | | 11/1994 | Moe et al. | 5,479,494 A | 12/1995 | Clitherow |
| 5,371,858 A | | 12/1994 | Miller | 5,481,603 A | 1/1996 | Gutierrez et al. |
| 5,375,068 A | | 12/1994 | Palmer et al. | 5,483,527 A | 1/1996 | Doshi et al. |
| 5,375,159 A | | 12/1994 | Williams | 5,483,549 A | 1/1996 | Weinberg et al. |
| 5,377,186 A | | 12/1994 | Wegner et al. | 5,483,586 A | 1/1996 | Sussman |
| 5,381,465 A | | 1/1995 | Carter et al. | 5,483,587 A | 1/1996 | Hogan et al. |
| 5,384,831 A | | 1/1995 | Creswell et al. | 5,483,676 A | 1/1996 | Mahany |
| 5,384,840 A | | 1/1995 | Blatchford et al. | 5,487,111 A | 1/1996 | Slusky |
| 5,386,467 A | | 1/1995 | Ahmad | 5,488,575 A | 1/1996 | Danielson |
| 5,390,175 A | | 2/1995 | Hiller et al. | 5,490,247 A | 2/1996 | Tung et al. |
| 5,390,335 A | | 2/1995 | Stephan et al. | 5,493,568 A | 2/1996 | Sampat et al. |
| 5,392,344 A | | 2/1995 | Ash et al. | 5,493,573 A | 2/1996 | Kobayashi et al. |
| 5,392,402 A | * | 2/1995 | Robrock, II ................. 709/227 | 5,495,521 A | 2/1996 | Rangachar |
| 5,394,436 A | | 2/1995 | Meier | 5,500,859 A | * 3/1996 | Sharma et al. ............... 370/468 |
| 5,396,542 A | | 3/1995 | Alger et al. | 5,500,889 A | 3/1996 | Baker et al. |
| 5,400,393 A | | 3/1995 | Knuth | 5,504,746 A | 4/1996 | Meier |
| 5,402,478 A | * | 3/1995 | Hluchyj et al. .......... 379/221.01 | 5,506,887 A | 4/1996 | Emery et al. |
| 5,406,557 A | | 4/1995 | Baudoin | 5,506,893 A | 4/1996 | Buscher et al. |
| 5,408,237 A | | 4/1995 | Patterson et al. | 5,511,111 A | 4/1996 | Serbetcioglu et al. |
| 5,408,382 A | | 4/1995 | Schultz | 5,513,127 A | 4/1996 | Gard et al. |
| 5,410,141 A | | 4/1995 | Koenck | 5,515,303 A | 5/1996 | Cargin, Jr. |
| 5,410,754 A | | 4/1995 | Klotzbach et al. | 5,517,434 A | 5/1996 | Hanson |
| 5,416,842 A | | 5/1995 | Aziz | 5,517,560 A | 5/1996 | Greenspan |
| 5,418,844 A | | 5/1995 | Morrisey et al. | 5,520,796 A | 5/1996 | Chen et al. |
| 5,420,211 A | | 5/1995 | Hughes | 5,521,370 A | 5/1996 | Hanson |
| 5,420,916 A | | 5/1995 | Sekiguchi | 5,521,719 A | 5/1996 | Yamada |
| 5,422,882 A | | 6/1995 | Hiller et al. | 5,521,924 A | 5/1996 | Kakuma et al. |
| 5,422,940 A | | 6/1995 | Endo et al. | 5,524,137 A | 6/1996 | Rhee |
| 5,422,941 A | | 6/1995 | Hasenauer et al. | 5,524,145 A | 6/1996 | Parker |
| 5,425,028 A | | 6/1995 | Britton et al. | 5,526,353 A | 6/1996 | Henley et al. |
| 5,425,051 A | | 6/1995 | Mahany | 5,526,416 A | 6/1996 | Dezonno et al. |
| 5,425,085 A | | 6/1995 | Weinberger et al. | 5,526,489 A | 6/1996 | Nilakatan et al. |
| 5,425,090 A | | 6/1995 | Orriss | 5,528,539 A | 6/1996 | Ong |
| 5,425,091 A | | 6/1995 | Josephs | 5,530,744 A | 6/1996 | Charalambous et al. |
| 5,426,636 A | | 6/1995 | Hiller et al. | 5,530,852 A | 6/1996 | Meske et al. |
| 5,428,608 A | | 6/1995 | Freeman et al. | 5,537,470 A | 7/1996 | Lee |
| 5,428,636 A | | 6/1995 | Meier | 5,539,193 A | 7/1996 | Gibbs |
| 5,430,719 A | * | 7/1995 | Weisser, Jr. ................. 370/389 | 5,539,194 A | 7/1996 | Miller |
| 5,430,727 A | | 7/1995 | Callon | 5,539,884 A | 7/1996 | Robrock, II |
| 5,434,852 A | | 7/1995 | La Porta et al. | 5,539,886 A | 7/1996 | Aldred et al. |
| 5,434,913 A | | 7/1995 | Tung et al. | 5,541,398 A | 7/1996 | Hanson |
| 5,436,957 A | | 7/1995 | McConnell | 5,541,917 A | 7/1996 | Farris |
| 5,436,963 A | | 7/1995 | Fitzpatrick et al. | 5,541,927 A | 7/1996 | Kristol et al. |
| 5,440,563 A | | 8/1995 | Isidoro et al. | 5,541,930 A | 7/1996 | Klingman |
| 5,440,620 A | | 8/1995 | Slusky | 5,544,010 A | 8/1996 | Schultz |
| 5,440,621 A | | 8/1995 | Castro | 5,551,025 A | 8/1996 | O'Reilly et al. |
| 5,442,690 A | | 8/1995 | Nazif et al. | 5,551,035 A | 8/1996 | Arnold et al. |
| 5,444,709 A | | 8/1995 | Riddle | 5,555,276 A | 9/1996 | Koenck |
| 5,448,633 A | | 9/1995 | Jamaleddin et al. | 5,559,068 A | 9/1996 | Chen |

| Patent No. | Date | Inventor(s) |
|---|---|---|
| 5,559,721 A | 9/1996 | Ishii |
| 5,559,871 A | 9/1996 | Smith |
| 5,561,670 A | 10/1996 | Hoffert et al. |
| 5,563,882 A | 10/1996 | Bruno et al. |
| 5,568,645 A | 10/1996 | Morris |
| 5,572,583 A | 11/1996 | Wheeler, Jr. et al. |
| 5,575,961 A | 11/1996 | Smyk |
| 5,576,529 A | 11/1996 | Koenck |
| 5,579,472 A | 11/1996 | Keyworth et al. |
| 5,583,564 A | 12/1996 | Rao |
| 5,583,920 A | 12/1996 | Wheeler, Jr. |
| 5,583,926 A | 12/1996 | Venier et al. |
| 5,583,929 A | 12/1996 | Ardon |
| 5,586,175 A | 12/1996 | Hogan |
| 5,586,177 A | 12/1996 | Farris et al. |
| 5,587,577 A | 12/1996 | Schultz |
| 5,590,127 A * | 12/1996 | Bales et al. ............... 370/260 |
| 5,590,133 A | 12/1996 | Billstrom et al. |
| 5,590,181 A | 12/1996 | Hogan |
| 5,590,346 A | 12/1996 | West |
| 5,594,717 A * | 1/1997 | Watanabe et al. ........... 370/232 |
| 5,594,769 A | 1/1997 | Pellegrino et al. |
| 5,594,784 A | 1/1997 | Velius |
| 5,594,789 A | 1/1997 | Seazholtz et al. |
| 5,598,464 A | 1/1997 | Hess et al. |
| 5,598,487 A | 1/1997 | Hacker |
| 5,602,456 A | 2/1997 | Cargin |
| 5,602,854 A | 2/1997 | Luse |
| 5,603,085 A | 2/1997 | Shedlo |
| 5,604,682 A | 2/1997 | McLaughlin et al. |
| 5,604,737 A | 2/1997 | Iwami et al. |
| 5,608,446 A | 3/1997 | Carr et al. |
| 5,608,447 A | 3/1997 | Farry et al. |
| 5,608,706 A | 3/1997 | Gordon |
| 5,608,786 A | 3/1997 | Gordon |
| 5,610,910 A | 3/1997 | Focsaneanu et al. |
| 5,610,972 A | 3/1997 | Emery et al. |
| 5,610,976 A | 3/1997 | Uota et al. |
| 5,610,977 A | 3/1997 | Williams et al. |
| 5,615,251 A | 3/1997 | Hogan |
| 5,617,343 A | 4/1997 | Danielson |
| 5,617,422 A | 4/1997 | Litzenberger et al. |
| 5,617,540 A | 4/1997 | Civanlar et al. |
| 5,619,555 A | 4/1997 | Fenton et al. |
| 5,619,557 A | 4/1997 | Van Berkum |
| 5,619,562 A | 4/1997 | Maurer et al. |
| 5,621,787 A | 4/1997 | McKoy et al. |
| 5,623,601 A | 4/1997 | Vu |
| 5,625,180 A | 4/1997 | Hanson |
| 5,625,404 A | 4/1997 | Grady et al. |
| 5,625,407 A | 4/1997 | Biggs et al. |
| 5,625,555 A | 4/1997 | Davis |
| 5,625,675 A | 4/1997 | Katsumaru et al. |
| 5,625,677 A | 4/1997 | Feiertag et al. |
| 5,625,681 A | 4/1997 | Butler, II |
| 5,625,682 A | 4/1997 | Gray et al. |
| 5,626,682 A | 5/1997 | Kobari et al. |
| 5,627,886 A | 5/1997 | Bowman |
| 5,633,916 A | 5/1997 | Goldhagen et al. |
| 5,633,919 A | 5/1997 | Hogan |
| 5,636,216 A | 6/1997 | Fox et al. |
| 5,638,430 A | 6/1997 | Hogan |
| 5,640,001 A | 6/1997 | Danielson |
| 5,644,471 A | 7/1997 | Schultz |
| 5,646,982 A | 7/1997 | Hogan et al. |
| 5,651,006 A | 7/1997 | Fujino et al. |
| 5,652,787 A | 7/1997 | O'Kelly |
| 5,654,957 A | 8/1997 | Koyama |
| 5,657,250 A | 8/1997 | Park et al. |
| 5,657,317 A | 8/1997 | Mahany |
| 5,661,197 A | 8/1997 | Villiger et al. |
| 5,661,782 A | 8/1997 | Bartholomew et al. |
| 5,661,790 A | 8/1997 | Hsu |
| 5,661,792 A | 8/1997 | Akinpelu et al. |
| 5,663,208 A | 9/1997 | Martin |
| 5,664,005 A | 9/1997 | Emery et al. |
| 5,664,102 A | 9/1997 | Faynberg |
| 5,668,857 A | 9/1997 | McHale |
| 5,669,062 A | 9/1997 | Olds et al. |
| 5,671,436 A | 9/1997 | Morrison |
| 5,672,860 A | 9/1997 | Miller |
| 5,673,031 A | 9/1997 | Meier |
| 5,673,263 A | 9/1997 | Basso et al. |
| 5,675,507 A | 10/1997 | Bobo, II |
| 5,675,741 A | 10/1997 | Aggarwal et al. |
| 5,679,943 A | 10/1997 | Koenck |
| 5,680,392 A | 10/1997 | Semaan |
| 5,680,442 A | 10/1997 | Bartholomew et al. |
| 5,680,446 A * | 10/1997 | Fleischer et al. ........ 379/114.28 |
| 5,680,633 A | 10/1997 | Koenck |
| 5,682,379 A | 10/1997 | Mahany |
| 5,687,167 A | 11/1997 | Bertin et al. |
| 5,689,550 A | 11/1997 | Garson et al. |
| 5,689,553 A | 11/1997 | Ahuja et al. |
| 5,692,039 A | 11/1997 | Brankley et al. |
| 5,694,318 A | 12/1997 | Miller |
| 5,694,463 A | 12/1997 | Christie et al. |
| 5,696,903 A | 12/1997 | Mahany |
| 5,699,089 A | 12/1997 | Murray |
| 5,699,352 A | 12/1997 | Kriete et al. |
| 5,699,528 A | 12/1997 | Hogan |
| 5,701,295 A | 12/1997 | Bales et al. |
| 5,701,465 A | 12/1997 | Baugher et al. |
| 5,703,935 A | 12/1997 | Raissyan et al. |
| 5,703,942 A | 12/1997 | Pinard et al. |
| 5,706,286 A | 1/1998 | Reiman et al. |
| 5,708,680 A | 1/1998 | Gollnick |
| 5,708,833 A | 1/1998 | Kinney |
| 5,710,728 A | 1/1998 | Danielson |
| 5,710,884 A | 1/1998 | Dedrick |
| 5,712,903 A | 1/1998 | Bartholomew et al. |
| 5,712,906 A | 1/1998 | Grady et al. |
| 5,712,907 A | 1/1998 | Wegner et al. |
| 5,712,908 A | 1/1998 | Brinkman et al. |
| 5,719,854 A * | 2/1998 | Choudhury et al. ......... 370/231 |
| 5,722,067 A | 2/1998 | Fougnies |
| 5,724,355 A | 3/1998 | Bruno et al. |
| 5,724,406 A | 3/1998 | Juster |
| 5,724,412 A | 3/1998 | Srinivasan |
| 5,726,984 A | 3/1998 | Kubler et al. |
| 5,727,002 A | 3/1998 | Miller et al. |
| 5,727,129 A | 3/1998 | Barrett et al. |
| 5,729,544 A | 3/1998 | Lev et al. |
| 5,729,599 A | 3/1998 | Plomondon et al. |
| 5,732,078 A | 3/1998 | Arango |
| 5,732,213 A | 3/1998 | Gessel et al. |
| 5,737,333 A | 4/1998 | Civanlar et al. |
| 5,737,395 A | 4/1998 | Irribarren |
| 5,737,404 A | 4/1998 | Segal |
| 5,737,414 A | 4/1998 | Walker et al. |
| 5,740,164 A | 4/1998 | Liron |
| 5,740,366 A | 4/1998 | Mahany |
| 5,742,596 A | 4/1998 | Baratz et al. |
| 5,742,668 A | 4/1998 | Pepe et al. |
| 5,742,670 A | 4/1998 | Bennett |
| 5,742,675 A | 4/1998 | Kilander et al. |
| 5,742,905 A | 4/1998 | Pepe et al. |
| 5,744,533 A | 4/1998 | Iwamoto et al. |
| 5,747,785 A | 5/1998 | Miller |
| 5,747,786 A | 5/1998 | Cargin, Jr. |
| 5,748,468 A | 5/1998 | Notenboom et al. |
| 5,748,619 A | 5/1998 | Meier |
| 5,751,706 A | 5/1998 | Land et al. |
| 5,751,707 A | 5/1998 | Voit et al. |
| 5,751,961 A | 5/1998 | Smyk |
| 5,754,639 A | 5/1998 | Flockhart et al. |

| | | | | | | |
|---|---|---|---|---|---|---|
| 5,754,641 A | 5/1998 | Voit et al. | | 5,867,495 A | 2/1999 | Elliot et al. |
| 5,757,784 A | 5/1998 | Liebowitz et al. | | 5,867,562 A | 2/1999 | Scherer |
| 5,758,281 A | 5/1998 | Emery et al. | | 5,867,566 A | 2/1999 | Hogan |
| 5,761,294 A | 6/1998 | Shaffer et al. | | 5,870,565 A | 2/1999 | Glitho |
| 5,763,867 A | 6/1998 | Main | | 5,873,099 A | 2/1999 | Hogan |
| 5,764,741 A | 6/1998 | Barak | | 5,878,126 A | 3/1999 | Velamuri et al. |
| 5,768,513 A | 6/1998 | Kuthyar et al. | | 5,878,130 A | 3/1999 | Andrews et al. |
| 5,774,530 A | 6/1998 | Montgomery et al. | | 5,878,212 A | 3/1999 | Civanlar et al. |
| 5,774,533 A | 6/1998 | Patel | | 5,881,134 A | 3/1999 | Foster et al. |
| 5,774,535 A | 6/1998 | Castro | | 5,883,891 A | 3/1999 | Williams et al. |
| 5,774,660 A | 6/1998 | Brendel et al. | | 5,884,032 A | 3/1999 | Bateman et al. |
| 5,774,695 A | 6/1998 | Autrey et al. | | 5,888,087 A | 3/1999 | Hanson |
| 5,778,313 A | 7/1998 | Fougnies | | 5,889,774 A | 3/1999 | Mirashrafi et al. |
| 5,781,550 A | 7/1998 | Templin et al. | | 5,892,754 A | 4/1999 | Kompella et al. |
| 5,781,620 A | 7/1998 | Montgomery et al. | | 5,892,822 A | 4/1999 | Gottlieb et al. |
| 5,781,624 A | 7/1998 | Mitra et al. | | 5,892,971 A | 4/1999 | Danielson |
| 5,784,617 A | 7/1998 | Greenstein et al. | | 5,895,431 A | 4/1999 | Miller |
| 5,787,160 A | 7/1998 | Chaney et al. | | 5,895,906 A | 4/1999 | Danielson |
| 5,790,172 A | 8/1998 | Imanaka | | 5,898,668 A | 4/1999 | Shaffer |
| 5,790,536 A | 8/1998 | Mahany | | 5,898,673 A | 4/1999 | Riggan et al. |
| 5,790,548 A | 8/1998 | Sistani zadeh et al. | | 5,901,140 A | 5/1999 | Van As et al. |
| 5,790,806 A | 8/1998 | Koperda | | 5,903,558 A * | 5/1999 | Jones et al. .............. 370/351 |
| 5,793,762 A | 8/1998 | Penners et al. | | 5,905,736 A | 5/1999 | Ronen et al. |
| 5,793,763 A | 8/1998 | Mayes et al. | | 5,907,547 A | 5/1999 | Foladare et al. |
| 5,793,771 A | 8/1998 | Darland et al. | | 5,910,946 A | 6/1999 | Csapo |
| 5,794,043 A | 8/1998 | Solomon | | 5,912,887 A | 6/1999 | Sehgal |
| 5,796,790 A | 8/1998 | Brunner | | 5,914,481 A | 6/1999 | Danielson |
| 5,799,072 A | 8/1998 | Vulcan et al. | | 5,915,001 A | 6/1999 | Uppaluru |
| 5,799,156 A | 8/1998 | Hogan | | 5,915,008 A | 6/1999 | Dulman |
| 5,802,502 A | 9/1998 | Gell et al. | | 5,915,012 A | 6/1999 | Miloslavsky |
| 5,802,510 A | 9/1998 | Jones | | 5,917,175 A | 6/1999 | Miller |
| 5,802,513 A | 9/1998 | Bowie, III | | 5,917,424 A | 6/1999 | Goldman et al. |
| 5,804,805 A | 9/1998 | Koenck | | 5,918,179 A | 6/1999 | Foladare et al. |
| 5,805,474 A | 9/1998 | Danielson | | 5,923,659 A | 7/1999 | Curry et al. |
| 5,805,587 A * | 9/1998 | Norris et al. .............. 370/352 | | 5,926,482 A | 7/1999 | Christie |
| 5,805,682 A | 9/1998 | Voit et al. | | 5,928,292 A | 7/1999 | Miller |
| 5,805,807 A | 9/1998 | Hanson | | 5,930,343 A | 7/1999 | Vasquez |
| 5,809,128 A | 9/1998 | McMullin | | 5,930,700 A | 7/1999 | Pepper |
| 5,812,534 A | 9/1998 | Davis et al. | | 5,933,425 A | 8/1999 | Iwata |
| 5,812,639 A | 9/1998 | Bartholomew et al. | | 5,936,958 A | 8/1999 | Soumiya et al. |
| 5,812,795 A | 9/1998 | Horovitz et al. | | 5,937,045 A | 8/1999 | Yaoya et al. |
| 5,812,834 A | 9/1998 | Suzuki | | 5,940,479 A | 8/1999 | Guy et al. |
| 5,812,865 A | 9/1998 | Theimer et al. | | 5,940,598 A | 8/1999 | Strauss et al. |
| 5,818,836 A | 10/1998 | DuVal | | 5,940,616 A | 8/1999 | Wang |
| 5,818,921 A | 10/1998 | Vander Meiden et al. | | 5,940,771 A | 8/1999 | Gollnick |
| 5,825,780 A | 10/1998 | Christie | | 5,944,795 A | 8/1999 | Civanlar |
| 5,825,862 A | 10/1998 | Voit et al. | | 5,946,299 A | 8/1999 | Blonder |
| 5,825,863 A | 10/1998 | Walker | | 5,946,386 A | 8/1999 | Rogers et al. |
| 5,825,869 A | 10/1998 | Brooks et al. | | 5,949,056 A | 9/1999 | White |
| 5,826,268 A | 10/1998 | Schaefer et al. | | 5,949,776 A | 9/1999 | Mahany |
| 5,828,737 A | 10/1998 | Sawyer | | 5,949,869 A | 9/1999 | Sink |
| 5,828,740 A | 10/1998 | Khuc et al. | | 5,953,322 A | 9/1999 | Kimball |
| 5,828,844 A | 10/1998 | Civanlar et al. | | 5,953,338 A | 9/1999 | Ma et al. |
| 5,832,197 A * | 11/1998 | Houji ............................. 714/4 | | 5,953,504 A | 9/1999 | Sokal et al. |
| 5,834,753 A | 11/1998 | Danielson | | 5,953,651 A | 9/1999 | Lu et al. |
| 5,835,723 A | 11/1998 | Andrews et al. | | 5,956,391 A | 9/1999 | Melen et al. |
| 5,838,665 A | 11/1998 | Kahn et al. | | 5,956,482 A | 9/1999 | Agraharam et al. |
| 5,838,682 A | 11/1998 | Dekelbaum et al. | | 5,956,697 A | 9/1999 | Usui |
| 5,838,686 A | 11/1998 | Ozkan | | 5,958,052 A | 9/1999 | Bellovin |
| 5,838,970 A | 11/1998 | Thomas | | 5,959,998 A | 9/1999 | Takahashi et al. |
| 5,841,764 A | 11/1998 | Roderique et al. | | 5,962,837 A | 10/1999 | Main et al. |
| 5,844,893 A | 12/1998 | Gollnick | | 5,966,431 A | 10/1999 | Reiman et al. |
| 5,844,896 A | 12/1998 | Marks et al. | | 5,966,434 A | 10/1999 | Schafer et al. |
| 5,845,267 A | 12/1998 | Ronen | | 5,969,321 A | 10/1999 | Danielson |
| 5,848,143 A | 12/1998 | Andrews et al. | | 5,970,065 A | 10/1999 | Miloslavsky |
| 5,850,358 A | 12/1998 | Danielson | | 5,970,477 A | 10/1999 | Roden |
| 5,850,433 A | 12/1998 | Rondeau | | 5,974,043 A | 10/1999 | Solomon |
| 5,854,833 A | 12/1998 | Hogan | | 5,974,052 A | 10/1999 | Johnson et al. |
| 5,854,975 A | 12/1998 | Fougnies | | 5,978,569 A | 11/1999 | Traeger |
| 5,856,364 A | 1/1999 | Martin | | 5,978,840 A | 11/1999 | Nguyen et al. |
| 5,862,171 A | 1/1999 | Mahany | | 5,979,768 A | 11/1999 | Koenck |
| 5,864,604 A | 1/1999 | Moen et al. | | 5,982,774 A | 11/1999 | Foladare et al. |
| 5,864,610 A | 1/1999 | Ronen | | 5,987,108 A | 11/1999 | Jagadish et al. |

| | | | | | | |
|---|---|---|---|---|---|---|
| 5,987,499 A | 11/1999 | Morris | | 6,154,777 A | 11/2000 | Ebrahim |
| 5,991,291 A | 11/1999 | Asai et al. | | 6,157,621 A | 12/2000 | Brown et al. |
| 5,991,292 A | 11/1999 | Focsaneanu et al. | | 6,157,636 A | 12/2000 | Voit et al. |
| 5,991,301 A | 11/1999 | Christie | | 6,157,648 A | 12/2000 | Voit et al. |
| 5,991,308 A | 11/1999 | Furhmann et al. | | 6,157,823 A | 12/2000 | Fougnies |
| 5,991,864 A | 11/1999 | Kinney . | | 6,169,735 B1 | 1/2001 | Alle et al. |
| 5,995,503 A | 11/1999 | Crawley et al. | | 6,175,618 B1 | 1/2001 | Shah et al. |
| 5,995,606 A | 11/1999 | Civanlar et al. | | 6,181,690 B1 | 1/2001 | Civanlar |
| 5,999,524 A | 12/1999 | Corbalis et al. | | 6,181,695 B1 | 1/2001 | Curry et al. |
| 5,999,525 A | 12/1999 | Krishnaswamy | | 6,181,703 B1 | 1/2001 | Christie |
| 6,005,926 A | 12/1999 | Mashinsky | | 6,185,184 B1 | 2/2001 | Mattaway |
| 6,006,100 A | 12/1999 | Koenck | | 6,185,198 B1 | 2/2001 | LaDue |
| 6,011,975 A | 1/2000 | Emery et al. | | 6,188,677 B1 | 2/2001 | Oyama et al. |
| 6,012,088 A | 1/2000 | Li et al. | | 6,192,050 B1 | 2/2001 | Stovall |
| 6,014,379 A | 1/2000 | White et al. | | 6,192,400 B1 | 2/2001 | Hanson |
| 6,014,687 A | 1/2000 | Watanabe et al. | | 6,195,425 B1 | 2/2001 | Farris et al. |
| 6,016,307 A | 1/2000 | Kaplan et al. | | 6,198,738 B1 | 3/2001 | Chang et al. |
| 6,016,343 A | 1/2000 | Hogan | | 6,201,812 B1 | 3/2001 | Christie |
| 6,018,567 A | 1/2000 | Dulman | | 6,205,139 B1 | 3/2001 | Voit |
| 6,021,126 A | 2/2000 | White et al. | | 6,212,162 B1 | 4/2001 | Horlin |
| 6,021,263 A | 2/2000 | Kujoory et al. | | 6,212,193 B1 | 4/2001 | Christie |
| 6,023,147 A | 2/2000 | Cargin | | 6,215,790 B1 | 4/2001 | Voit et al. |
| 6,023,474 A | 2/2000 | Christie | | 6,222,919 B1 | 4/2001 | Hollatz et al. |
| 6,026,087 A | 2/2000 | Mirashrafi et al. | | 6,226,287 B1 | 5/2001 | Brady |
| 6,026,091 A | 2/2000 | Christie | | 6,226,678 B1 | 5/2001 | Mattaway |
| 6,028,858 A | 2/2000 | Rivers et al. | | 6,230,203 B1 | 5/2001 | Koperda et al. |
| 6,029,062 A | 2/2000 | Hanson | | 6,233,318 B1 | 5/2001 | Picard et al. |
| 6,029,261 A | 2/2000 | Christie | | 6,233,604 B1 | 5/2001 | Van Horne et al. |
| 6,031,840 A | 2/2000 | Christie | | 6,236,851 B1 | 5/2001 | Fougnies |
| 6,035,028 A | 3/2000 | Ward et al. | | 6,240,091 B1 | 5/2001 | Ginzboorg et al. |
| 6,036,093 A | 3/2000 | Schultz | | 6,243,373 B1 | 6/2001 | Turock |
| 6,041,109 A | 3/2000 | Cardy et al. | | 6,243,374 B1 | 6/2001 | White |
| 6,041,117 A | 3/2000 | Androski et al. | | 6,252,869 B1 | 6/2001 | Silverman |
| 6,044,081 A | 3/2000 | Bell et al. | | 6,260,067 B1 | 7/2001 | Barnhouse et al. |
| 6,046,992 A | 4/2000 | Meier | | 6,263,372 B1 | 7/2001 | Hogan |
| 6,049,545 A | 4/2000 | Stephenson et al. | | 6,266,685 B1 | 7/2001 | Danielson |
| 6,049,813 A | 4/2000 | Danielson | | 6,278,693 B1 | 8/2001 | Aldred et al. |
| 6,052,450 A | 4/2000 | Allison et al. | | 6,278,704 B1 | 8/2001 | Creamer et al. |
| 6,058,000 A | 5/2000 | Koenck | | 6,279,038 B1 | 8/2001 | Hogan |
| 6,064,653 A | 5/2000 | Farris | | 6,282,281 B1 | 8/2001 | Low |
| 6,069,890 A | 5/2000 | White et al. | | 6,282,284 B1 | 8/2001 | Dezonno et al. |
| 6,075,783 A | 6/2000 | Voit | | 6,282,574 B1 | 8/2001 | Voit et al. |
| 6,078,582 A | 6/2000 | Curry et al. | | 6,285,745 B1 | 9/2001 | Bartholomew et al. |
| 6,078,943 A | 6/2000 | Yu | | 6,289,010 B1 | 9/2001 | Voit et al. |
| 6,081,525 A | 6/2000 | Christie | | 6,292,478 B1 | 9/2001 | Farris |
| 6,084,867 A | 7/2000 | Meier | | 6,295,292 B1 | 9/2001 | Voit et al. |
| 6,084,953 A | 7/2000 | Bardenheuer et al. | | 6,298,057 B1 | 10/2001 | Guy |
| 6,088,431 A | 7/2000 | LaDue | | 6,298,064 B1 | 10/2001 | Christie |
| 6,097,804 A | 8/2000 | Gilbert et al. | | 6,298,120 B1 | 10/2001 | Civanlar et al. |
| 6,098,094 A | 8/2000 | Barnhouse et al. | | 6,301,609 B1 | 10/2001 | Aravamudan et al. |
| 6,101,182 A | 8/2000 | Sistanizadeh et al. | | 6,304,567 B1 | 10/2001 | Rosenburg |
| 6,104,645 A | 8/2000 | Ong | | 6,310,873 B1 | 10/2001 | Rainis et al. |
| 6,104,711 A | 8/2000 | Viot | | 6,314,103 B1 | 11/2001 | Christie |
| 6,108,341 A | 8/2000 | Christie | | 6,324,264 B1 | 11/2001 | Wiener et al. |
| 6,108,704 A | 8/2000 | Hutton | | 6,327,258 B1 | 12/2001 | Deschaine et al. |
| 6,112,206 A | 8/2000 | Morris | | 6,330,250 B1 | 12/2001 | Curry et al. |
| 6,115,458 A | 9/2000 | Taskett | | 6,332,023 B1 | 12/2001 | Porter et al. |
| 6,115,737 A | 9/2000 | Ely et al. | | 6,335,927 B1 | 1/2002 | Elliott |
| 6,118,936 A | 9/2000 | Lauer et al. | | 6,343,115 B1 | 1/2002 | Foladare et al. |
| 6,122,255 A | 9/2000 | Bartholomew et al. | | 6,347,085 B2 | 2/2002 | Kelly |
| 6,125,113 A | 9/2000 | Farris et al. | | 6,359,880 B1 | 3/2002 | Curry |
| 6,131,121 A | 10/2000 | Mattaway | | 6,373,929 B1 | 4/2002 | Johnson et al. |
| 6,134,433 A | 10/2000 | Joong et al. | | 6,375,344 B1 | 4/2002 | Hanson |
| 6,137,792 A | 10/2000 | Jonas et al. | | 6,381,321 B1 | 4/2002 | Brown et al. |
| 6,137,869 A | 10/2000 | Voit et al. | | 6,385,191 B1 | 5/2002 | Coffman et al. |
| 6,141,404 A | 10/2000 | Westerlage et al. | | 6,385,193 B1 | 5/2002 | Civanlar et al. |
| 6,141,412 A | 10/2000 | Smith et al. | | 6,400,702 B1 | 6/2002 | Meier |
| 6,144,647 A | 11/2000 | Lopez-Torres | | 6,407,991 B1 | 6/2002 | Meier |
| 6,144,661 A | 11/2000 | Katsube et al. | | 6,430,195 B1 | 8/2002 | Christie |
| 6,144,667 A | 11/2000 | Doshi et al. | | 6,438,218 B1 | 8/2002 | Farris |
| 6,144,976 A | 11/2000 | Silva | | 6,456,617 B1 | 9/2002 | Oda et al. |
| 6,149,062 A | 11/2000 | Danielson | | 6,498,788 B1 | 12/2002 | Emilsson et al. |
| 6,154,445 A | 11/2000 | Farris et al. | | 6,513,066 B1 | 1/2003 | Hutton |

| | | | | | | |
|---|---|---|---|---|---|---|
| 6,529,516 B1 | 3/2003 | Parzych | | 2004/0146020 A1 | 7/2004 | Kubler |
| 6,539,015 B2 | 3/2003 | Voit et al. | | 2004/0146037 A1 | 7/2004 | Kubler |
| 6,539,077 B1 | 3/2003 | Ranalli et al. | | 2004/0151150 A1 | 8/2004 | Kubler |
| 6,542,497 B1 | 4/2003 | Curry | | 2004/0151151 A1 | 8/2004 | Kubler |
| 6,574,216 B1 | 6/2003 | Farris et al. | | 2004/0151164 A1 | 8/2004 | Kubler |
| 6,594,254 B1 | 7/2003 | Kelly | | 2004/0160912 A1 | 8/2004 | Kubler |
| 6,600,733 B2 | 7/2003 | Deng | | 2004/0160913 A1 | 8/2004 | Kubler |
| 6,614,768 B1 | 9/2003 | Mahany | | 2004/0162889 A1 | 8/2004 | Morris |
| 6,621,942 B1 | 9/2003 | Hacker | | 2004/0165573 A1 | 8/2004 | Kubler |
| 6,625,170 B1 | 9/2003 | Curry et al. | | 2004/0165793 A1 | 8/2004 | Hacker |
| 6,654,357 B1 | 11/2003 | Wiedeman | | 2004/0166895 A1 | 8/2004 | Koenck |
| 6,671,285 B1 | 12/2003 | Kirkby et al. | | 2004/0169583 A1 | 9/2004 | Meier |
| 6,678,718 B1 | 1/2004 | Khouri et al. | | 2004/0174841 A1 | 9/2004 | Kubler |
| 6,681,994 B1 | 1/2004 | Koenck | | 2004/0174842 A1 | 9/2004 | Kubler |
| 6,687,738 B1 | 2/2004 | Hutton | | 2004/0174843 A1 | 9/2004 | Kubler |
| 6,688,523 B1 | 2/2004 | Koenck | | 2004/0246940 A1 | 12/2004 | Kubler |
| 6,690,788 B1 | 2/2004 | Bauer et al. | | 2004/0264442 A1 | 12/2004 | Kubler |
| 6,694,359 B1 | 2/2004 | Morris | | 2005/0008002 A1 | 1/2005 | Kubler |
| 6,701,365 B1 | 3/2004 | Hutton | | 2005/0013266 A1 | 1/2005 | Kubler |
| 6,704,287 B1 | 3/2004 | Moharram | | 2005/0021713 A1 | 1/2005 | Dugan et al. |
| 6,711,241 B1 | 3/2004 | White et al. | | 2005/0036467 A1 | 2/2005 | Kubler |
| 6,714,559 B1 | 3/2004 | Meier | | 2005/0078647 A1 | 4/2005 | Meier |
| 6,714,983 B1 | 3/2004 | Koenck | | 2005/0083872 A1 | 4/2005 | Kubler |
| 6,754,181 B1 | 6/2004 | Elliott et al. | | 2005/0087603 A1 | 4/2005 | Mahany |
| 6,760,429 B1 | 7/2004 | Hung et al. | | 2005/0191989 A1 | 9/2005 | Plush et al. |
| 6,775,519 B1 | 8/2004 | Wiedeman et al. | | 2005/0195859 A1 | 9/2005 | Mahany |
| 6,792,256 B1 | 9/2004 | Kinney | | 2005/0232213 A1 | 10/2005 | Meier |
| 6,810,033 B2 | 10/2004 | Derks | | 2005/0242192 A1 | 11/2005 | Koenck |
| 6,826,165 B1 | 11/2004 | Meier | | 2005/0254475 A1 | 11/2005 | Kubler |
| 6,829,645 B1 | 12/2004 | Hutton | | 2006/0007951 A1 | 1/2006 | Meier |
| 6,870,827 B1 | 3/2005 | Voit et al. | | 2006/0062240 A1 | 3/2006 | Meier |
| 6,895,419 B1 | 5/2005 | Cargin | | 2006/0131420 A1 | 6/2006 | Koenck |
| 6,910,632 B2 | 6/2005 | Koerck | | 2006/0233161 A1 | 10/2006 | Koenck |
| 6,990,090 B2 | 1/2006 | Meier | | 2006/0251226 A1 | 11/2006 | Hogan |
| 7,012,898 B1 | 3/2006 | Farris et al. | | 2006/0268806 A1 | 11/2006 | Meier |
| 7,013,001 B1 | 3/2006 | Felger | | 2006/0268807 A1 | 11/2006 | Meier |
| 7,085,362 B1 | 8/2006 | Christie | | 2006/0274732 A1 | 12/2006 | Allen et al. |
| 7,088,705 B2 | 8/2006 | Curry | | 2006/0274735 A1 | 12/2006 | Allen et al. |
| 7,092,379 B1 | 8/2006 | Singh et al. | | 2006/0291752 A1 | 12/2006 | Hacker |
| 7,120,319 B2 | 10/2006 | Danielson | | 2007/0001007 A1 | 1/2007 | Koenck |
| 7,149,208 B2 | 12/2006 | Mattaway | | 2007/0007353 A1 | 1/2007 | Danielson |
| 7,170,887 B2 | 1/2007 | Rosenberg | | 2007/0065046 A1 | 3/2007 | Hacker |
| 7,206,592 B1 | 4/2007 | Gollnick | | 2007/0076687 A1 | 4/2007 | Low et al. |
| 7,236,575 B2 | 6/2007 | Kim et al. | | 2007/0086445 A1 | 4/2007 | Mattaway |
| 7,274,662 B1 | 9/2007 | Kalmanek, Jr. et al. | | 2007/0121591 A1 | 5/2007 | Donovan |
| 7,286,562 B1 | 10/2007 | Vargo et al. | | 2007/0201515 A1 | 8/2007 | Lewis |
| 7,295,830 B2 | 11/2007 | Lippelt | | 2007/0206576 A1 | 9/2007 | Radulovic |
| 7,359,972 B2 | 4/2008 | Jorgensen | | 2007/0263644 A1 | 11/2007 | Christie et al. |
| 7,492,886 B1 | 2/2009 | Kalmanek | | 2008/0013531 A1 | 1/2008 | Elliott et al. |
| 7,502,339 B1 | 3/2009 | Pirkola et al. | | 2008/0063161 A1 | 3/2008 | Joyce et al. |
| 2002/0064149 A1 | 5/2002 | Elliott | | 2009/0022147 A1 | 1/2009 | Farris et al. |
| 2002/0067739 A1 | 6/2002 | Wilkes et al. | | | | |
| 2002/0083166 A1 | 6/2002 | Dugan et al. | | | | |
| 2002/0114324 A1 | 8/2002 | Low et al. | | | | |

FOREIGN PATENT DOCUMENTS

| | | |
|---|---|---|
| 2002/0159461 A1 | 10/2002 | Hamamoto et al. |
| 2003/0078006 A1 | 4/2003 | Mahany |
| 2003/0112767 A1 | 6/2003 | Meier |
| 2003/0169767 A1 | 9/2003 | Christie |
| 2003/0189941 A1 | 10/2003 | Christie |
| 2003/0198218 A1 | 10/2003 | Farris et al. |
| 2003/0198335 A1 | 10/2003 | Porter et al. |
| 2004/0005046 A1 | 1/2004 | Deo et al. |
| 2004/0018851 A1 | 1/2004 | Koenck |
| 2004/0023651 A1 | 2/2004 | Gollnick |
| 2004/0038717 A1 | 2/2004 | Mahany |
| 2004/0044667 A1 | 3/2004 | Mahany |
| 2004/0073933 A1 | 4/2004 | Gollnick |
| 2004/0090952 A1 | 5/2004 | Kubler |
| 2004/0093363 A1 | 5/2004 | Cargin |
| 2004/0114567 A1 | 6/2004 | Kubler |
| 2004/0125753 A1 | 7/2004 | Mahany |
| 2004/0131018 A1 | 7/2004 | Johnson et al. |
| 2004/0145775 A1 | 7/2004 | Kubler |

| | | |
|---|---|---|
| EP | 0335562 | 4/1989 |
| EP | 0365885 | 5/1990 |
| EP | 0381365 | 8/1990 |
| EP | 0559979 | 9/1993 |
| EP | 0729281 | 2/1995 |
| EP | 0365885 | 9/1995 |
| EP | 0767568 | 10/1995 |
| EP | 0381365 | 4/1996 |
| EP | 0802690 | 4/1996 |
| EP | 0335562 | 7/1996 |
| EP | 0722237 | 7/1996 |
| EP | 0781016 | 6/1997 |
| EP | 0812089 | 12/1997 |
| EP | 0823809 | 2/1998 |
| EP | 0722237 | 11/2007 |
| JP | 09-168051 | 6/1997 |
| JP | 09-168063 | 6/1997 |
| JP | 09-168064 | 6/1997 |
| JP | 09-168065 | 6/1997 |

| | | |
|---|---|---|
| JP | 09-172459 | 6/1997 |
| JP | 09-172462 | 6/1997 |
| WO | 91/07839 | 5/1991 |
| WO | 94/11813 | 5/1994 |
| WO | 95/22221 | 8/1995 |
| WO | 95/29564 | 11/1995 |
| WO | 96/20448 | 7/1996 |
| WO | 96/20553 | 7/1996 |
| WO | 96/32800 | 10/1996 |
| WO | 96/34341 | 10/1996 |
| WO | 96/38018 | 11/1996 |
| WO | 97/14238 | 4/1997 |
| WO | 97/20424 | 6/1997 |
| WO | 97/22211 | 6/1997 |
| WO | 97/23078 | 6/1997 |
| WO | 97/28628 | 8/1997 |
| WO | 97/33412 | 9/1997 |
| WO | 98/12860 | 3/1998 |
| WO | 98/23080 | 5/1998 |
| WO | 98/34391 | 8/1998 |

OTHER PUBLICATIONS

Shah et al. "*Application of a New Network Concept for Faster Service Deployment*" International Conference on Comm. 88 Jun. 12-15, 1988, IEEE Comm. Soc. Conference. Record, vol. 3, pp. 1327-1329.
Stevens, "TCPIP Illustrated", vol. 1, 1994, Addison-Wesley, pp. 12-122 and inside cover.
Keiser et al., "Digital Telephony and Network Integration", 1995, Chapman Hall, Second Edition, pp. 426-428. cited by examiner.
Chopra, Manvinder, Exploring Intelligent Peripheral Configuration, Universal Personal Communications, 1994. Record., 1994 Third Annual International Conference on, Sep. 27-Oct. 1, 1994, pp. 635-639.
Yang, "INETPhone: Telephone Services and Servers on Internet", RFC 1789, Apr. 1995. .
Edwin Margulies, "Understanding The Voice Enabled Internet", Aug. 1996, pp. 4-42; 12-1-3..
"Overview", NetSpeak Corporation, Apr. 8, 1997, printed from Edgar Online.
"NetSpeak Corporation to Exhibit First Release of Voice Over IP, IP-to-PSTN Networking Products", Business Wire, Jun. 2, 1997.
Noerpel et al., "PACS: Personal Access Communications System—A Tutorial," IEEE Personal Communications, Jun. 1996.
Varma et al., "Architecture for Interworking Data over PCS," IEEE Communications Magazine, Sep. 1996, 124-130.
U.S. Appl. No. 60/023,891, filed Aug. 16, 1996.
Mills, M. (Mar. 8, 1996) "Freebie Heebie-Jeebies: New Long-Distance Calling Via the Internet Scares Small Phone Firms", The Washington Post, sec. F, pp. 1-2.
Hughes, D.T. (Feb. 21, 1995) "What Hath (Net) God Wrought?", The Journal [Fairfax, Virginia], sec. B, pp. 1-2.
Hughes, D.T. (May 28, 1996) "WebPhone Heading for Serious Telephony", The Journal, [Fairfax, Virginia], sec. A, p. 8.
Mills, M. (Jan. 23, 1996) "It's the Net's Best Thing to Being There: With Right Software, Computer Becomes Toll-Free Telephone", The Washington Post, sec. C, pp. 1,5.
Hughes, D.T. (Jan. 2, 1996) "Internet Phone Wars Heating Up: Companies Improve and Encourage Users to Test Products", The Journal, [Fairfax, Virginia], sec. A, p. 6.
Kuehn, Richard A. (Jul. 1994) "The Voice of Technology", [Online text only] Credit World, vol. 82, No. 6, pp. 20-23.
C. Low, "The Internet Telephony Red Herring," Hewlett-Packard Laboratories, (May 15, 1996), pp. 1-15.
C. Low et al., WebIN-an architecture for fast deployment of IN-based personal services, Intelligent Network Workshop, 1996, IN '96, IEEE, (Apr. 21-24, 1996), vol. 2, 196+258.
Cady et al., "Mastering the Internet", Sybex Inc., Alameda, CA 1994, ISBN 94-69309.
Audio Messaging Interchange Specification (AMIS)—Analog Protocol, Version 1, Issue 2, Feb. 1992.

Jabbari, B., "Common Channel Signaling System No. 7, for ISDN and Intelligent Networks", Proceedings of the IEEE, vol. 79, No. 2, Feb. 1991, pp. 155-169.
"Supercharging the Web with Computer Telephony", CT and the 'Net, Mar. 1996. .
"Audio and Video Over the Internet", CT and the 'Net, Computer Telephony, Mar. 1996. .
Grigonis, Richard, "Computer Telephony Over The Internet", CT and the Net, Mar. 1996. .
"Geek of The Week: Carl Malamud Interviews Phil Kam & Jun Murai", Internet Talk Radio, Mobile IP Networking, Nov. 1993. .
McConnell, Brian, "How to Build an Internet PBX", Pacific Telephony Design, printed from http://www.phonezone.com/ip-phone.htm Mar. 5, 1997.
"Welcome to the Phone Zone", Pacific Telephony Design, http://www.phonezone.com/index2.htm, pp. 1-6. .
Sears, Andrew, "Innovations in Internet Telephony: The Internet as The Competitor to The Pots Network", Innovations in Internet Telephony: The Internet as the Successor to the Pots Network, Feb. 28, 1996, pp. 1-6. .
"Computer Telephony And The Internet", Stylus Innovation, http://www.stylus.com/hvml.htm..
Hedrick, C., "Routing Information Protocol", Jun. 1988, http://www.internic.net/rfc/rfc1058.txt, pp. 1-30.
Mills, D.L., "An Experimental Multiple-Path Routing Algorithm", Mar. 1986, http://www.internic.net/rfc/rfc981.txt, pp. 1-20. .
Lougheed et al., "A Border Gateway Protocol (BGP)", Jun. 1990, http://www.internic.net/rfc/rfc1163.txt, pp. 1-26.
S. Deering, "Host Extensions for IP Multicasting", Aug. 1989, http://www.internic.net/rfc/rfc1112.txt, pp. 1-16. .
Waitzman et al., "Distance Vector Multicast Routing Protocol", Nov. 1988, http://www.internic.net/rfc/rfc1075.txt, pp. 1-22. .
Hinden et al., "The DARPA Internet Gateway", Sep. 1982, http://www.internic.net/rfc/rfc823.txt, pp. 1-41..
"VocalTec's Telephony Gateway—The Ultimate Internet Telephony Solution?," Computer Telephony Magazine, Sep. 1996.
"A Call to Phones," Wired Magazine, Issue 4.03, http://www.wired.com/wired/archive/4.03/updata.html (Mar. 1996).
Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published Apr. 1995.
Blackwell et al. "Secure Short-Cut Routing for Mobile IP," USENIX Summary 1994 Technical Conferences, Jun. 6-10, 1994.
Okada et al. "Mobile Communication Using PHS [Personal Handy Phone System] Communications Server," National Technical Report, vol. 42, No. 1, pp. 46-54 (Feb. 1996).
Sattler, Michael, "Nautilus Voice Encryption," May 10, 1995.
Chernov, Andrey A. "SpeakFreely" software, Apr. 18, 1996.
"Netspeak Corporation Introduces Webphone, Industry's First Internet-Based Telephony Solution for Business Users," PC Forum, Mar. 18, 1996.
"Free World Dialup Beta 2.0a Client," Feb. 12, 1996.
Kahane et al., "VocalTec IP Forum Contribution", VocalTec Inc., Seattle, WA, Jan. 15, 1997.
"Internet Telephony for Dummies" 2nd Edition, Chapters 14-16, 1997.
Kahane et al., "Call Management Agent System Specification" VoIP Forum Technical Committee, Aug. 14, 199.
IMTC Voice over IP Forum Service Interoperability Implementation Agreement, Draft 0.91, Document VoIP-008, Jan. 13, 1997.
Sebestyn, I., ITU Telecommunication Standardization Sector, Study Group 15, Q;2&3/15 Rapporteur Meeting, Document AVC-1086, v1, Dec. 5, 1996.
Oppen et al., "The Clearinghouse: A Decentralized Agent for Locating Named Objects in a Distributed Environment", ACM Transactions on Office Information Systems, vol. 1, No. 3, Jul. 1983, pp. 230-253.
"Camelot Announces Internet Voice Communication Technology Breakthrough", HighBeamTM Encyclopedia, From: PR Newswire, http://www.encyclopedia.com/doc/1G1-16452259.html?Q=Caml, Feb. 13, 1995, 2 pages.

1979 Annual Technical Report, "A Research Program in Computer Technology", Oct. 1978-Sep. 1979, Prepared for the Defense Advanced Research Projects Agency, University of Southern California, ISI-SR-80-17.

Cohen et al., "A Network Voice Protocol NVP-11", Lincoln Laboratory Massachusetts Institute of Technology, Apr. 1, 1981, ISI/RR-83-23.

1982 Annual Technical Report, "A Research Program in Computer Technology", Jul. 1981-Jun. 1982, University of Southern California, ISI/SR-83-23.

Annual Report to the Defense Communications Agency, "Network Speech Systems Technology Program", Massachusetts Institute of Technology Lincoln Laboratory, Oct. 1, 1980-Sep. 30, 1981, issued Feb. 4, 1982.

Heggestad et al., "Voice and Date Communication Experiments on a Wideband Satellite/Terrestrial Internetwork System", IEEE International Conference on Communications, Integrating Communication for World Progress, Jun. 19-22, 1983.

Annual Report to the Defense Communications Agency, "Defense Switched Network Technology and Experiments Technology", Massachusetts Institute of Technology Lincoln Laboratory, Oct. 1, 1981-Sep. 30, 1982, issued Feb. 5, 1983.

Merritt, "Providing Telephone Line Access to a Packet Voice Network", University of Southern California, Feb. 1983, ISI/RR-83-107.

Weinstein, "The Experimental Integrated Switched Networks- A System Level Network Text Facility", Proceedings of 1983 IEEE Military Communications Conference, Washington, DC, Oct. 31, 1983-Nov. 2, 1983.

Cesner et al., "Wideband Communications", 1984 Annual Technical Report, University of Southern California, ISI/SR-85-150, Jul. 1983-Jun. 1984.

Annual Report to the Defense Communications Agency, "Defense Switched Network Technology and Experiments Technology", Massachusetts Institute of Technology Lincoln Laboratory, Oct. 1, 1982-Sep. 30, 1983, issued Feb. 29, 1984.

Gross, "Proceedings of the Oct. 15-17, 1988 Joint Meeting of the Internet Engineering and Internet Architecture Task Forces", Fourth IETF, The Mitre Corporation.

Corley, "Bellsouth Trial of Wideband Packet Technology", Bellsouth Services, 1990 IEEE, CH2829-0/90/0000-1000.

Inoue et al., "Evolution Scenario of Broadband Services Based on Granulated Broadband Network Concept", IEEE Region 10 Conference, Tencon 92, Nov. 11-13, 1992.

Inoue et al., "Granulated Broadband Network Applicable to B-ISDN and PSTN Services", IEEE Journal on Selected Areas in Communiations, vol. 10, No. 9, Dec. 1992.

Cerf et al., "A Protocol for Packet Network Intercommunication", IEEE Transactions on Communications, No. 8, May 1974.

Cole, "Dialing in the WB Network", Information Sciences Institute University of Southern California, Dialing-Cole.83, Apr. 30, 1981.

Hapgood, "Dialing Without Dollars", Jul. 1995, vol. 17, No. 4, pp. 18, Journal Code, INO.

Yang, "INETPhone: Telephone Services and Servers on Internet", Network Working Group, RFC 1798, Apr. 1995, http://ds.internic.net/rfc/rfc1798.txt.

Chen et al., "Integrated Voice/Data Switching", IEEE Communication Magazine, Jun. 1988, vol. 26, No. 6.

Frezza, "The Internet Phone is Poised to Conquer", Communications Week, Dec. 11, 1995, http://techweb.cmp.com/cw/current.

"Internet Access: Internet Phone-to-Phone Technology Now a Reality . . . ", EDGE Publishing , Aug. 12, 1996.

"Internet Phone Saves 50% on Long Distance", 411 Newsletter, Aug. 5, 1996, vol. 17, No. 15, United Communications Group.

"Internet Phone Calls are Cheap but Limited", New Media Markets, Feb. 23, 1995, Financial Times Business Information, Ltd., ISSN:0265-4717.

"Internet Telephony Seems to be Evolving East, But is There Anyone on the Line?", Computergram International, Aug. 19, 1996, No. 2980, ISSN: 0268-716X.

"Internet's International Phone Calls are Cheap But Limited", Telecom Markets, Financial Times Business Information ID, Mar. 2, 1995, ISSN: 0267-1484.

Mills, The Washington Post, "Phone Service Via the Internet May Slash Rates", Aug. 11, 1996.

Sears, "The Effect of Internet Telephone of the Long Distance Voice Market", Jan. 14, 1995.

National Technical Information Service, Wideband Integrated Voice/Data Technology, ADA132284, Mar. 31, 1983, Massachusetts Inst. of Tech., Lexington, Lincoln Lab.

Detreville et al., "A Distributed Experimental Communications System", Advances in Local Area Networks, IEEE Press, 1987.

Borden et al., "Integration of Real-Time Services in an IP-ATM Network", Internet RFC/STD/FYI/BCP ARchives, Aug. 1995.

Laubach, "Classical IP and ARP over ATM" Hewlett-Packard Laboratories, Jan. 1994, http://www.faqs.org/rfc/rfc1577.txt.

Comer, "Internetworking with TCP/IP", vol. 1, Principles, Protocols, and Architecture, Department of Computer Sciences, 1995.

Perez et al., "ATM Signaling Support for IP Over ATM", Network Working Group, RFC 1765, Feb. 1995, http://www.ietf.org/rfc/rfc1765.txt.

"Welcome to the Phone Zone", Pacific Telephony Design, http://www.phonezone.com/index2.htm, pp. 1-6. 1996.

"Computer Telephony And The Internet", Stylus Innovation, http://www.stylus.com/hvml.htm. 1997.

Zellweger, Polle T., et al., "An overview of the etherphone system and its applications," Xerox Palo Alto Research Center, pp. 160-168, Apr. 1988.

Ng, L.J., et al., "Distributed architectures and databases for intelligent personal communication networks," Department of Electrical Engineering, U. of British Columbia, pp. 300-304, Feb. 1992.

Malyan, Andrew D., et al., "Network architecture and signaling for wireless Personal communications," IEEE Journal On Selected Areas in Communications, vol. 11, No. 6, pp. 830-841, Aug. 1993.

Malyan, Andrew D., et al. "A Microcellular Interconnection Architecture For Personal Communications Networks," Department of Electrical Engineering, University of British Columbia Vancouver, B.C., V6T 1W.5, Canada, pp. 502-505, Feb. 1992.

Bakre, Ajay, et al., "M-RPC: A Remote Procedure Call Service for Mobile Clients," Department of Computer Science Rutgers, The State University of New Jersey Piscataway, NJ, pp. 97-110, 1995.

O'Malley, Sean W., "A Dynamic Network Architecture," Department of Computer Science, University of Arizona, ACM Transactions on computer systems, vol. 10, No. 2, pp. 110-143, May 1992.

Cheshire, Stuart, et al., "Internet Mobility 4 by 4," SIGCOMM 96 - Stanford, California, USA, pp. 1-2, Aug. 1996.

Chang, Rong N., et al., "A Service Acquisition Mechanism for the Client/Service Model in Cygnus," IBM Canada Laboratory Technical Report TR 74.059, pp. 323-345. Dec. 1991.

Arao, Shinya, et al., "Component-based policy deployment for service level differentiation in converging communication networks," IEEE, pp. 1388-1392, 1999.

Goyal, Pawan, et al., "Integration of call signaling and resource management for IP telephony," IEEE Network, pp. 24-32, May/Jun. 1999.

Delatore, J.P., et al., "The 5ESS switching system: Fatory system testing," AT+T Technical Journal, vol. 64, No. 6, Jul.-Aug. 1985.

Oran, Dave, "Dial plan mapping for voice-over-IP," Access Engineering, Apr. 11, 1996.

Getting started guide for Internet Phone release 4, http://www.vocaltec.com, 1993-1996 VocalTec Inc.

VocalTec desktop dialer version 3.0, User reference, http://www.vocaltec.com, 1997 VocalTec Ltd.

"Vocaltec's telephony gateway software captures 1996 product of the year honors from computer telephony magazine," Herzliya, Israel, Dec. 18, 1996, VocalTec, Ltd.

"Introduction to VTG," Northvale, NJ 07647, Tel. 201-768-9400, info@vocaltec.com. Dec. 1996.

Kahane, Opher, et al., "IMTC VoIP Forum Contribution." Subject: Call management agent system requirements function architecture and protocol, VoIP97-010, pp. 1-44, Seattle, Jan. 1, 1997.

Kahane, Opher, "Introduction to VocalTec's CMA system," Intelligent switching for a new era of telecom, Nov. 7, 1996.

Newton, Harry, "Newton's Telecom Dictionary," 22nd edition, pp. 728, 2006.

Braden, R., et al., "Resource ReSerVation Protocol (RSVP) - Version 1 Functional Specification," Network Working Group, pp. 1-224, Univ. of Michigan, Sep. 1997.
Keiser, Bernhard E., et al., "Digital Telephony and Network Integration," downloaded Jul. 1, 2008.
Boyle, Jim, et al., "The COPS (Common Open Policy Service) Protocol," http://www.ietf.orgiinternet-drafts/draft-ietf-rap-cops-07.txt, pp. 1-35, Aug. 16, 1999.
Bellamy, John, "Digital telephony," Dallas, TX, Oct. 1981.
Open and standardized - the world of IP Protocols, "H.323: The Leading Standard in Voice over IP," downloaded Jul. 1, 2008.
"Inside APPN - The Essential Guide to the Next-Generation SNA," IBM, International Technical Support Organization Raleigh Center, Raleigh, NC, Jun. 1997.
Friedes, A., et al. "Integrating the world through communications," IEEE ICC, vol. 1 of 3, Jun. 22-25, 1986.
Huitema, Christian, "Routing in the internet," Prentice Hall, Englewood Cliffs, NJ, 1995.
Lucky, R.W., "Applications of communications theory," Fundamentals of digital switching, AT+T Laboratories, Second Edition, downloaded, Jul. 3, 2008.
Bellamy, John, "Digital telephony," Second Edition, Wiley Series in Telecommunications, downloaded, Jul. 3, 2008.
Stallings, William, "ISDN and Broadband ISDN with frame relay and ATM," Prentice Hall, Upper Saddle River, NJ, downloaded, Jul. 3, 2008.
GR-1298-CORE, AINGR: Switching Systems, Telcordia Technologies, Issue 10, Nov. 2004.
GR-2863-CORE, CCS Network Interface Specification (CCSNIS) Supporting Advanced Intelligent Network (AIN), Bellcore, Bell Communications Research, Issue 2, Dec. 1995.
GR-246-CORE, Telcordia technologies specification of signalling system No. 7, Telcordia Technologies, Issue 10, Dec. 2005.
GR-1280-CORE, Advanced intelligent network (AIN) service control point (SCP) generic requirements, Telcordia Technologies, Issue 1, Aug. 1993.
Morris, Christopher, Academic Press Dictionary of Science and Technology, Academic Press, downloaded, Jul. 3, 2008.
GR-1428-CORE, CCS Network Interface Specification (CCSNIS) Supporting Toll-Free Service, Bellcore, Issue 2, May 1995.
Mockapetris, P., "Domain names - concepts and facilities," Network working group, Nov. 1987.
Mockapetris, P., "Domain names - implementation and specification," Network Working Group, Nov. 1987.
Finseth, C. "An access control protocol, sometimes called TACACS," Network Working Group, University of Minnesota, pp. 1-20, Jul. 1993.
Carrel, D., "The TACACS+ Protocol," Network Working Group, Cisco, Oct. 1996.
ITU-T, "Line transmission of non-telephone signals," Recommendation H.323, May 28, 1996.
Product releases webpage, VocalTec, info@vocaltec.com, Aug. 26, 1996.
Tutorial on "H.323," by The International Engineering Consortium, http://www.iec.org, pp. 1-30, downloaded, Jul. 3, 2008.
Everhart, C., et al., "New DNS RR Definitions," Network Working Group, University of Maryland, pp. 1-11, Oct. 1990.
Handley, M., et al., "SIP: Session Initiation Protocol," Network Working Group, The Internet Society, Mar. 1999.
Rosenberg, J., et al., "SIP: Session Initiation Protocol," Network Working Group, The Internet Society, Jun. 2002.
Brannen, Lynn, et al., "Next generation switch," MCI Telecommunications, May 16, 1997.
Shen, Yi-Shang, "Communications network with flexible call routing and resource allocation," MCI Invention Disclosure Form, Jan. 8, 1998.
Kahane, Opher, et al, "Call management agent system specification," VoIP Forum Technical Committee Contribution, Chicago, II, Aug. 14, 1996.
Pulver, Jeff, "The Internet telephone tookit," Wiley Computer Publishing, New York, NY, 1996.
Haley, James E., "Pay-per-call blocking using LIDB," AIN Service Description, Bell Atlantic Easy Number Call Routing Service, Oct. 1996.
American National Standard for Telecommunications - Signalling System No. 7 (SS7) - Signalling Connection Control Part (SCCP), American National Standards Institue, Inc., ANSITI.112-1992, Oct. 26, 1992.
American National Standard for Telecommunications - Signalling System No. 7 (SS7) - Message Transfer Part (MTP), American National Standards Institue, Inc., Mar. 14, 1996.
American National Standard for Telecommunications - Signalling System No. 7 (SS7) - Signalling Connection Control Part (SCCP), American National Standards Institue, Inc., ANSITI.110-1992, Jun. 2, 1992.
Gasman, Lawrence, "Broadband networking," Van Nostrand Reinhold, Jun. 13, 1994.
Balkovich, Ed, et al., "Project clarity: First internal trial," Readiness Review, Bell Atlantic Confidential and proprietary, Jul. 21, 1997.
Grigonis, Richard "Zippy," "Computer telephony over the Internet," CT and the 'Net, Mar. 1996.
Park, Myung Ah, et al., "Dial-up internet access service system with automatic billing mechanism," ICICS 1997, Electronics .and. Telecommunications Research Institute, pp. 148-151, Singapore, Sep. 9-12, 1997.
El-Gendy, Hazem, et al., "Computer-supported routing for intelligent networks and personalized wired communications," ICCS 1994, pp. 1027-1033, Aug. 1994.
"Audio and video over the Internet," CT and the 'Net, Mar. 1996.
Malamud, Carl, et al., "Internet talk radio: Geek of the week," Mobile IP Networking, O'Reilly .and. Associates, Inc., transcript of interview, Nov. 1993.
McConnell, Brian, "How to build an Internet PBX," Pacific Telephony Design, http://www.phonezone.com/ip-phone.htm, pp. 1-9, Oct. 28, 1996.
Sears, Andrew, "Innovations in Internet Telephony: The Internet as the Competitor to the POTS Network," Innovation in Internet Telephony: The Internet as the Successor to the POTS Network, pp. 1-6, Feb. 28, 1996.
"Supercharging the web with computer telephony," CT and the 'Net, Mar. 1996.
Anand, Surinder S., et al., "Accounting architecture for cellular networks," ICPWC '96, IEEE, pp. 184-189, 1996.
Karttunen, Jari, et al., "Cost structure analysis and reference model for SCALEABLE network services," The Institution of Electrical Engineers, pp. 1-9, 1996.
Jennings, Barbara J., "End-User Requirements for High-Integrity Directory," Sandia National Laboratories, Albuquerque, IEEE, pp. 1793-1796, 1996.
Botvich, D., et al., "On Charging for Internet Services provided over an A.TIVI network," IEEE, pp. 669-679, 1997.
Estrin, Deborah, et al., "Design Considerations for Usage Accounting and Feedback In Internetworks," downloaded, Aug. 19, 2008.
Li, Chung-Sheng, et al., ""Time-driven Priority" Flow Control for Real-time Heterogeneous Internetworking," IBM T. J. Watson .and. esearch Center, IEEE, pp. 189-197, 1996.
Edell, RJ., et al., "Billing users and pricing for TCP," IEEE Journal on Selected Areas in Communications, vol. 13, Issue 7, pp. 1162-1175, Sep. 1995.
Margulies, Ed, "CT's Cyberdate With the 'Net," Computer Telephony Periscope, pp. 28-29, Aug. 1996.
Inamori, Hisayoshi, et al., "Common Software Platform for Realizing a Strategy for Introducing the TMN," Network Operations and Management Symposium, vol. 2, pp. 579-589, Feb. 1998.
Rajan, R., et al., "A policy framework for integrated and differentiated services inthe Internet," Network, IEEE, vol. 13, Issue 5, pp. 36-41, Sep./Oct. 1999.
Louth, Nick, "MCI Communications Corp. vaults phone-data divide," Reuters Limited, News article, Jan. 29, 1998.
Eriksson, Hans, "MBONE: The Multicast Backbone," file:IIICI/Documents%20and%20Settings/ralbertJDesktopIMBONE%2OThe%20Multicast%20Backbone. htm (1 of 13)Mar. 7, 2008 4:06:17 PM.

Macedonia, Michael R., et al., "MBone Provides Audio and Video Across the Internet," file:///CI/Documents%20and%20Settings/ralbert/Deskt 20Audio%20and%20Video%20Across%20th%20Internet.htm (1 of 13) Mar. 10, 2008 9: 34:00 AM.

Lapolla, Stephanie, "Net call centers, voice to merge," News, PC Week, Mar. 31, 1997.

Bohn, Roger, et al., "Mitigating the coming Internet crunch: multiple service levels via precedence," San Diego Supercomputer Center, Mar. 22, 1994.

Weiss, W., "QoS with differentiated services," Bell Labs Technical Journal vol. 3, No. 4, pp. 48-62, Oct.-Dec. 1998.

Hartanto, Felix, et al., "Policy-Based Billing Architecture for Internet Differentiated Services," Proceedings of IFIP Fifth International Conference on Broadband Communications (BC '99), Hong Kong, Nov. 10-12, 1999.

Mahadevan, I., et al., "Parallel Architectures, Algorithms, and Networks," (I-SPAN '99) Proceedings. Fourth InternationalSymposium, pp. 420-425, Jun. 23-25, 1999.

Schulzrinne, H., et al., "A Transport Protocol for Real-Time Applications," Network Working Group, Audio-Video Transport Working Group, pp. 1-151, Mar. 10, 2008.

Schulzrinne, H., "RTP Profile for Audio and Video Conferences with Minimal Control," Network Working Group, Audio-Video Transport Working Group, pp. 1-18, Jan. 1996.

Kim, Gary, "Talk is cheap voice over the internet," America's Network, pp. 34-39, Jul. 15, 1996.

Newton, Harry, "Notes from the field: The personal side of CT," 12 Computer Telephony, Jan. 1997.

Venditto, Gus, "Internet phones the future is calling," Internet World Magazine, Jun. 1996.

Crowcroft, Jon, et al., "Pricing internet services," Department of Computer Science, UCL, Gower Street, London, UK, pp. 1-16, downloaded, Aug. 19, 2008.

Newton, Harry, "Telephony Messaging on the Internet," http://www.dialogweb.com/cgi/dwclient?req=1205770063076 (1 of 5) Mar. 17, 2008 12:08:09 PM.

Maruyama, Katsumi, et al., "A Concurrent Object-Oriented Switching Program in Chill," 2460 IEEE Communications Magazine, Jan. 29, 1991, No. 1, pp. 60-68, New York.

Rajkumar, R., et al., "A resource allocation model for QoS management," Proceedings. The 18th IEEE Real-Time Systems Symposium (Cat.No.97CB36172) p. 298-307, Dec. 2-5, 1997.

Weinrib, A., et al., "Decentralized resource allocation for distributed systems," IEEE INFOCOM '87. The Conference on Computer Communications. Proceedings. Sixth Annual Conference - Global Networks: Concept to Realization (Cat.No.87CH2412-5) p. 328-336, M.

Shabana, Mohamed, et al., "Intelligent switch architecture," 8081 Proceedings of the National Communications Forum 42 Sep. 30, 1988, No. 2, Chicago, II., pp. 1312-1319.

Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A.

Elixmann, Martin, et al., "Open Switching - Extending Control Architectures to Facilitate Applications," ISS Symposium, pp. 239-243, Apr. 23, 1995.

Chandra, P., et al., "Network support for application-oriented QoS," (IWQoS 98) 1998 Sixth International Workshop on Quality of Service, pp. 187-195, May 18-20, 1998.

Klein, Rachelle S., et al., "Minimax Resource Allocation With Tree Structured Substitutable Resources,"Operations Research, vol. 39, No. 2, p. p. 285-295, Mar.-Apr. 1991.

Nyong, D., et al., "Resource based policies for design of interworking heterogeneous service networks," Interoperable Communications Networks, vol. 1, Nos. 2-4, pp. 571-80, 1998.

Kabay, S., et al., "The service node-an advanced IN services element," 8438 BT Technology Journal vol. 13 Apr. 1995, No. 2, pp. 64-72.

Mayer, Robert L, et al., "Service Net-2000: An intelligent network evolution," 8010 At.and.T Technical Journal 70 (1991) Summer, No. 3/4, pp. 99-110, Short Hills, NJ.

Peeren, Rene, "IN in the Hybrid Broadband Network The Intelligent Web," Presentation, Ericsson, IEEE 1996.

Jain, Surinder K., "Evolving Existing Narrowband Networks Towards Broadband Networks with IN Capabilities," Bellcore Intelligent Networks, IEEE, Apr. 22, 1996.

Matta, Ibrahim, et al, "Type-of-Service Routing in Dynamic Datagram Networks," Department of Computer Science, University of Maryland, pp. 992-999, IEEE 1994.

Yeager, Nancy J., et al., "Web Server Technology: The Advanced Guide for World Wide Web Information Providers," National Center for Supercomputing Applications, pp. 250, Morgan Kaufman Publishers, Inc., 1996.

Kishimoto, Ryozo, "Agent Communication System for Multimedia Communication Services," IEEE INFOCOM, Fifteenth Annual Joint Conference of the IEEE Computer and Communications Societies, pp. 10-17, Mar. 24-28, 1996.

Willebeek-LeMair, Marc H., "Videoconferencing over Packet-Based Networks," IEEE Journal on Selected Areas in Communications, vol. 15. No. 6, pp. 1101-1114, Aug. 1997.

Kumar, Vinay, "Internet Multicasting: Internet's Next Big Thing," ICAST Corporation, pp. 1-13, Sep. 23, 1997.

The Wall Street Journal article on: "MCI's New Service For Corporate Use Sets 1 Line for Net, Phone," pp. B16, Jan. 30, 1997.

Sharp, C.D., et al., "Advanced Intelligent Networks-now a reality," Electronics .and. Communication Engineering Journal, pp. 153-162, Jun. 1994.

Pezzutti, David A., "Operations Issues for Advanced Intelligent Networks," IEEE Communications Magazine, pp. 58-63, Feb. 1992.

Oppen, Derek C., et al., "The Clearinghouse: A Decentralized Agent for Locating Named Objects in a Distributed Environment," ACM Transactions on Office Information Systems, vol. 1, No. 3, Jul. 1983, pp. 230-253.

Rendleman, John, et al., "ATM Goes Into Orbit . . . While IP Gets Speedy in Space," Communications Week, Mar. 17, 1997, www.commweek.com.

Miller, Mark A., "Troubleshooting TCP/IP: Analyzing the Protocols of the Internet," M.and.T Books, pp. 365-389, 1992.

Platt, Richard, "Why IsoEthernet Will Change the Voice and Video Worlds," IEEE Communications Magazine, pp. 55-59, Apr. 1996.

Quicklook, "Internet By Stellite," 1 page, http://www.netsatx.net. Dec. 1990.

Rosalyn, Retkwa, "Telephone Politics," Internet World, Jun. 1996.

Schreyer, Oliver, et al., "Least Cost Call Routing - A Brilliant Application for Private IN," IEEE International Conference on Communications, vol. 2 of 3, Jun. 23-27, 1996.

Rodriguez Serrano, Inma, "Evolution of a Hybrid Fibre Coaxial Network for Multimedia Interactive Services," British Telecommunications Egineering, vol. 15, pp. 249-253, Oct. 1996.

Sunaga, Hiroshi, et al., "A Reliable Communication Switching Platform for Quick Service Provisioning," IEEE International Conference on Communications, Seattle, WA, Jun. 18-22, 1995.

Marketing materials re: Workshops on "Telephony on the Internet," to take place on Sep. 24-25, 1996, at The Drake Hotel, Chicago, Illinois.

Gralla, Preston, "How the Internet Works," Ziff-Davis Press, pp. 118-119, 1996.

Gralla, Preston, "How the Internet Works," Ziff-Davis Press, pp. 64-67, 1996.

Tsuchida, Hisazumi, et al., "Intelligent Dynamic Service Provisioning Architecture in the Multimedia Era," NTT Information and Communication Systems Laboratories, IEEE, pp. 1117-1122, 1996.

Low, Colin, "Integrating Communication Services," IEEE Communications Magazine, pp. 164-169, Jun. 1997.

Fridisch, M., et al., "Terminals for Accessing the Internet - The Internet Telephone," Alcatel Telecommunications Review, 4th Quarter, pp. 304-309, 1996.

Hurwicz, Michael, "Switched ATM is fast, but not that smart. Routed IP is smart, but not that fast. Why not combine them?," http://www.ipsilon.com/, Apr. 1997.

Diehl, Standford, "Data's New Voice," BYTE, Special Report, pp. 129-135, Sep. 1996.

Kahn, Jeffery, "Videoconferencing Debuts on the Internet," LBL, U.S. Department of Energy, Berkeley, California, University of California, Feb. 28, 1995.

Braun, Hans-Werner, et al., "A framework for flow-based accounting on the Internet," National Science Foundation (NCR-9119473), downloaded, Aug. 21, 2008.

Kelly, Katy, "Up to their laptops in packed powder: Mountaintop office keeps skiers in touch," USA Today, Final Edition, News, pp. 1A, Feb. 21, 1997.

Braun, Torsten, "Implementation of an Internet Video Conferencing Application over ATM," IBM European Networking Center, Heidelberg, Germany, IEEE, pp. 287-294, 1997.

Sclavos, Jean, et al., "Information Model: From Abstraction to Application," Telecom Paris, France, pp. 1-13, downloaded, Aug. 21, 2008.

Black, Uyless D., "OSI: A model for computer communications standards," Prentice-Hall, Inc., pp. 157-201, 1991.

Sriram, Kotikalapudi, et al., "Voice Packetization and Compression in Broadband ATM Networks," IEEE Journal on Selected Areas in Communications, vol. 9, No. 3, pp. 294-304, Apr. 1991.

Arango, Mauricio, et al., "Guaranteed Internet Bandwith," IEEE, pp. 862-866, Nov. 18, 1996.

Lapolla, Stephanie, "Seagate joins the backup vendors' enterprise forays," PC Week, The National Newspaper of Corporate Computing, vol. 13, No. 33, Aug.19, 1996.

Harmer, Julie, et al., "Revised Requirements for Mobile-API-Interim deliverable," OnTheMove public project, pp. 1-44, Dec. 1996.

Schulzrinne, Henning, "Personal Mobility for Multimedia Services in the Internet," IDMS '96 (European Workshop on Interactive Distributed Multimedia Systems and Services), Berlin, Germany, pp. 1-18, Mar. 4-6, 1996.

Schulzrinne, "Simple Conference Invitation Protocol," Internet Engineering Task Force, pp. 1-19, Feb. 22, 1996.

Ash, G.R., et al., "Design and Optimization of Networks With Dynamic Routing," American Telephone and Telegraph Company, The Bell System Technical Journal, vol. 60, No. 8, pp. 1787-1820, Oct. 1981.

Prosecution history of U.S. Patent No. 6,332,023, Issued, Dec. 18, 2001.

The Phone Zone, an online reference cite and catalog of PC based telephony and networking solution for business, http://www.phonezone.com/index2.htm, Oct. 29, 1996.

"IDT's Net2Phone Launches Phone-to-Phone Technology Via The Internet," Press release, http://web.net2phone.com/about/press/releases/p2p.asp, Sep. 8, 1997.

"Vocaltec's telephony gateway - the ultimate internet telephony solution?," Computer Telephony, pp. 30, Sep. 1996.

Cheriton, David R., "Dissemination-Oriented Communication Systems: Final Report," ARPA contract No. DABT63-91-K-0001, Nov. 26, 1996.

Johnson, David B., "Scalable Support for Transparent Mobile Host Internetworking," Proceedings of the Ninth Annual IEEE Worshop on Computer Communications, pp. 1-10, Oct. 1994.

"Specifications of Signalling System No. 7," International Telecommunication Union, ITU-T Telecommunication Standardization Sector of ITU, Recommendation, Q.700, Mar. 1993.

"Integrated Services Digital Network (ISDN) 1.312," CCITT The International Telegraph and Telephone Consultative Committee, ITU International Telecommunication Union, Recommendation, 1.312/Q.1201, Oct. 1992.

"Interface Recommendation for Intelligent Network CS-1," International Telecommunication Union, ITU-T Telecommunication Standardization Sector of ITU, ITU-T Recommendation Q.1218, Oct. 1995.

"Series Q: Switching and Signalling," Intelligent Network, International Telecommunication Union, ITU-T, Telecommunication Standardization Sector of ITU, Recommendation Q.1218 - Addendum 1, Sep. 1997.

Imielinski, Tomasz, et al., "Mobile Wireless Computing: Solutions and Challenges in Data Management," Department of Computer Science, Rutgers University, downloaded, Oct. 22, 2008.

Balmer, R., et al., "A Concept for RSVP Over DiffServ," Institute of Computer Science and Applied Mathematics, University of Berne, Switzerland, http://www.iam.unibe.ch/~rvs, pp. 412-417, IEEE, May 2000.

Ziegler, Jr., K., "A Distributed Information System Study," IBM SYST J, vol. 18, No. 3, pp. 374-401, 1979.

Blake, S., et al., "An Architecture for Differentiated Services," Network Working Group, pp. 1-36, Dec. 1998.

Walters, Rob, "Computer Telephony Integration," Second Edition, Artech House, 1999.

IMTC Voice over IP Forum Service Interoperability Implementation Agreement, Draft 0.91, IMTC Voice over IP Forum Technical Committee, Vol. P97-008, Jan. 13, 1997.

Braden, R., et al., "Integrated Services in the Internet Architecture: an Overview," Network Working Group, pp. 1-28, Jul. 1994.

Braun, Torsten, "Internet Protocols for Multimedia Communications," Part II: Resource Reservation, Transport, and Application Protocols, IEEE MultiMedia, pp. 74-82, Oct.-Dec. 1997.

Black, Uyless D., "Internet Telephony Call Processing Protocols," Prentice Hall PTR, www.phptr.com, 2001.

Briere, Daniel D., et al., "Internet Telephony for Dummies," 2nd Edition, IDG Books Worlwide, Inc., 1997.

Vin, Harrick M., et al., "Multimedia Conferencing in the Etherphone Environment," Xerox Palo Alto Research Center, IEEE, pp. 69-79, Oct. 1991.

Detti, Andrea, et al., "Supporting RSVP in a Differentiated Service Domain: an Architectural Framework and a Scalability Analysis," http://www-st.inf.tu-dresden.de/elisa/, downloaded, Oct. 27, 2008.

Bernet, Yoram, "The Complementary Roles of RSVP and Differentiated Services in the Full-Service QoS Network," QoS Mechanisms, Microsoft, downloaded, Oct. 27, 2008.

Herzog, S., et al., "COPS Usage for RSVP," Network Working Group, pp. 1-15, Jan. 2000.

Sebestyen, Istvan, "What is the position of Q.2, 0.3/15 on Internet Telephony for the IMTC - VoIP Forum Meeting in Seattle," ITU Telecommunication Standardization Sector, Study Group 15, pp. 1-5, Dec. 5, 1996.

Daniele, M., et al., "Textual Conventions for Internet Network Addresses," Nework Working Group, pp. 1-16, Jun. 2000.

Handley, M., et al., "SIP: Session Initiation Protocol," Internet Engineering Task Force, pp. 1-30, Dec. 2, 1996.

Weinstein, Clifford J., "The Experimental Integrated Switched Network - a System-Level Network Test Facility," IEEE, pp. 449-456, Jan. 1983.

"Computer Telephony and the Internet," pp. 1-8, downloaded, Jul. 14, 2009.

Jitian, Xiao, et al., "Sharing Model of Netware Node Resources and Real-Time Scheduling," Mini-Micro Systems, vol. 16, No. 12, pp. 54-59, Dec. 1995.

Swinehart, D.C., et al., "Adding Voice to an Office Computer Network," IEEE Global Telecommunications Conference, San Diego, CA, Nov. 28-Dec. 1, 1983.

Mills, Mike, "Phone service via the Internet may slash rates," The Washington Post, A Section; p. A01, Sunday, Final Edition, Aug. 11, 1996.

Chapman, Martin, et al, "Overall Concepts and Principles of TINA," TINA-C, Version 1.0, Feb. 17, 1995.

Kahane, Opher, et al, "Call Management Agent System Specification," Voice over IP Forum Technical Committee in Chicago, Aug. 14, 1996.

Verjinski, Richard D., "PHASE, A Portable Host Access System Environment," IEEE, May 1989.

*Verizon Services Corp.*, et al., v. *Cox Fibernet Virginia, Inc.*, et al., Report of Herman J. Helgert, Ph.D., Exhibit D, downloaded, Aug. 21, 2008.

*Verizon Services Corp.*, et al., v. *Cox Fibernet Virginia, Inc.*, et al., Report of Herman J. Helgert, Ph.D., Exhibit E, downloaded, Aug. 21, 2008.

*Verizon Services Corp.*, et al., v. *Cox Fibernet Virginia, Inc.*, et al., Report of Herman J. Helgert, Ph.D., Exhibit F, downloaded, Aug. 21, 2008.

The Jeff Pulver Blog: Free World Dialup and Verizon's patent on "name translation," http://pulverblog.pulver.com/archives/006846.html, pp. 1-19, Apr. 23, 2007.

Lipoff, Stuart, "Operations Support System Framework for Data Over Cable Services," Data Over Cable Technical Reports, MCNS Holdings, L.P., Oct. 16, 1996.

Sinnreich, H., et al., "Interdomain IP communications with QoS, authorization and usage reporting," http:www.cs.columbia.edu/-hgs/sip/drafts/draft-sinnreich-sip-qos-osp, Feb. 2000.

Pan, Ping, et al., "Diameter: Policy and Accounting Extension for SIP," Internet Engineering Task Force, Internet Draft, pp. 1-17, Nov. 15, 1998.

Schulzrinne, Henning, et al., "Interaction of Call Setup and Resource Reservation Protocols in Internet Telephony," pp. 1-13, Jun. 11, 1999, downloaded, Aug. 21, 2008.

Rosen, E., et al., "Memo re: BGP/MPLS VPNs," Networking Group, pp. 1-25, Mar. 1999.

Waksberg, M., "Axe 10 and the Intelligent Network," Commutation .and. Transmission, No. 4, pp. 67-76, Dec. 1993.

Niitsu, Yoshihiro, et al., "Computer-aided stepwise service creation environment for intelligent network," NTT Communication Switching Laboratories, Tokyo, Japan, IEEE, pp. 454-458, 1992.

Morgan, Michael J., et al., "Service creation technologies for the intelligent network," At.and.t Technical Journal, Summer 1991.

Fujioka, Masanobu, et al., "Universal service creation and provision environment for intelligent network," XIII International Switching Symposium, Stockholm, Sweden, Proceedings vol. III, pp. 149-156, May 27-Jun. 1, 1990.

Moy, J., "OSPF Version 2," Network Working Group, Proteon, Inc., Jul. 1991.

Lantz, Keith A., "Towards a universal directory service," Operating Systems Review, vol. 20, No. 2, Apr. 1986.

Fang, Wenjia, "Building An Accounting Infrastructure for the Internet," Princeton University, IEEE, pp. 105-109, 1996.

Aidarous, Salah, et al., "The role of the element management layer in network management," 1994 IEEE Network Operations and Management Symposium, Feb. 14-17, 1994.

Gareiss, Robin, "Voice over the internet," Data Communications, pp. 93-100, Sep. 1996.

Bethoney, Herb, "HAHTSite Gives Pros Everything They Need," PC Week, p. 36, Mar. 10, 1997.

Kolarov, Aleksandar, et al., "End-to-end Adaptive Rate Based Congestion Control Scheme for ABR Service in Wide Area ATM Networks," IEEE International Conference on Communications, Seattle, Washington, pp. 138-143, Feb. 1995.

Chen, Larry T., et al., "ATM and Satellite Distribution of Multimedia Educational Courseware," 1996 IEEE International Conference on Communications, pp. 1133-1137, Jun. 23-27, 1996.

Civanlar, M. Reha, et al., "FusionNet: Joining the Internet .and. Phone Networks for Multimedia Applications," ACM Multimedia 96, pp. 431-432, 1996.

Cobbold, Christopher, et al., "Enhancement for Integrated Wireless Personal Communications over Metropolitan Area Networks," 1996 IEEE International Conference on Communications, pp. 1370-1376, Jun. 23-27, 1996.

Corner, Douglas E., "Internetworking With TCP/IP," 3rd ed., V. 1. Principles, protocols, and architecture, Prentice-Hall, Inc., 1995.

Mahadevan, I., et al., "Quality of service achitectures for wireless networks: IntServ andDiffSery models," http://ieeexplore.ieee.org/xpllabsprintf.jsp?arnumber==778974.and.page . . . , Aug. 6, 2002.

Ahmadi, H., et al., "NBBS Traffic management overview," IBM Systems Journal, vol. 34, No. 4, pp. 604-628, 1995.

Stoica, Ion, et al., "LIRA: An Approach for Service Differentiation in the internet," sponsored by DARPA under contract Nos. N66001-96-C-8528 and NOOI74-96-K-0002, and by a NSF Career Award under grant No. NCR-9624979. Additional support was provi Sep. 1998.

Duan, Juan, et al., "Efficient Utilization of Multiple Channels between two Switches in ATM Networks," IEEE, pp. 1906-1911, 1995.

Ejiri, Masayoshi, et al., "For Whom the Advancing service/network management," IEEE pp. 8A.3.1-8A.3.5, 1991.

Lee, Whay Chiou et al., "Integrated Packet Networks With Quality of Service Constraints," Globecom, IEEE, pp. 8A.3.1-8A.3.5, 1991.

Elia, Carlo, et al., "Skyplex: Distributed Up-link for Digital Television via Satellite," IEEE Intelligent Network workshop IN, Melbourne, Australia, Apr. 21-24, 1996.

Ely, Tom, "The Service Control Point as a Cross Network Integrator," Bellcore, IEEE, pp. 1-8, 1996.

Mamais, G., et al., "Efficient buffer management and scheduling in a combined IntServand DiffSery architecture: a performance study," ATM, 1999. ICATM '99. 1999 2nd International Conference on, pp. 236-242, Jun. 21-23, 1999.

Baumgartner, F., et al., "Differentiated services: a new approach for quality of service in the Internet," Proceedings of Eighth International Conference on High Performance Networking, pp. 255-273, Sep. 21-25, 1998.

Sibal, Sandeep, et al., "Controlling Alternate Routing in General-Mesh Packet Flow Networks," SIGCOMM 1994, London, England, pp. 168-179, Aug. 1994.

Jajszczyk, A., et al., "Bringing information to People," IEEE INFOCOM '95, Proceedings, vol. 3, Apr. 2-6, 1995.

CT and the 'Net, "Webphone," Computer Telephony pp. 219-221, Mar. 1996.

Sisalem, Dorgham, et al., "The Network Video Terminal," IEEE Proceedings of HPDC-5, pp. 3-10, 1996.

Baumgartner, H., et al., "Middleware for a New Generation of Mobile Networks: The ACTS OnTheMove Project," http://www.isoc.org/inet96/proceedings/a6/a6_3.htm, pp. 1-4, Apr. 14, 2008.

"Talk Talk," telecom, pp. 68-72, Jun. 1996.

Kreller, Birgit, et al., "UMTS: A Middleware Architecture and Mobile API Approach," IEEE Personal Communications, pp. 32-38, Apr. 1998.

Low, Colin, et al., "WebIN - An Architecture for Fast Deployment of IN-based Personal Services," IEEE, 1996.

Grami, A., et al., "The Role of Satellites in the Information Superhighway," IEEE International Conference on Communications, pp. 1577-1581, Jun. 18-22, 1995.

Gupta, Ranabir, et al., "Technical Assessment of (T)INA - TMN - OSI Technology for Service Management Applications," IEEE Network Operations and Management Symposium, vol. 3, pp. 877-887, Feb. 14-17, 1994.

Inamori, Hisayoshi, et al., "Applying TMN to a Distributed Communications Node System with Common Platform Software," NTT Network Service Systems Laboratories, Tokyo, Japan, pp. 83-87, IEEE International Conference on Communications, Seattle, WA, Jun.18, 1995.

Clark, David D., et al., "Supporting Real-Time Applications in an Integrated Services Packet Network: Architecture and Mechanism," COMM'92, MD, USA, pp. 14-26, Aug. 1992.

Gupta, Amit, "Resource sharing for multi-party real-time communication," Proceedings of the Fourteenth Annual Joint Conference of the IEEE Computer and Communication Societies (INFOCOM '95), pp. 1230-1237, 1995.

Kausar, Nadia, et al., "A Charging Model for Sessions on the Internet," IEEE, pp. 32-38, Apr. 1999.

Schutzrinne, Henning, "A comprehensive multimedia control architecture for the Internet," IEEE, pp. 65-76, Sep. 1997.

Tsaoussidis, V., et al., "A CORBA-based Application Service Middleware Architecture and Implementation," State University, of NY at Stony Brook, pp. 1-7, downloaded, Aug. 19, 2008.

Bernet, Y., et al., "A Framework for Differentiated Services," The Internet Society, pp. 1-35, Sep. 22, 1999.

Gleeson, B., et al., "A Framework for IP Based Virtual Private Networks," The Internet Society, pp. 1-62, Feb. 2000.

Yavatkar, Raj, et al., "A Framework for Policy-based Admission Control," Internet Engineering Task Force, pp. 1-19, Apr. 1999.

Ekstein, Ronnie, et al., "AAA Protocols: Comparison between RADIUS, DIAMETER and COPS,"Internet Engineering Task Force (IETF), pp. 1-17, Aug. 1999.

Hussmann, H., et al., "An edge device for supporting internet integrated services over switched ATM networks," pp. 1-10, downloaded, Aug. 19, 2008.

Sinnreich, H., et al., "Interdomain IP communications with QoS, authorization and usage reporting," http:www.ietf,org/internet-drafts . . . , Jan. 2000.

Mascolo, Cecilia, et al., "An XML based Programmable Network Platform," Dept. of Computer Science, University College London, pp. 1-5, Jun. 10, 2005.

Kumar, Vijay P., et al., "Beyond Best Effort: Router Architectures for the Differentiated Services of Tomorrow's Internet," IEEE Communications Magazine, pp. 152-164, May 1998.

Pan, Ping, et al., "Diameter-SIP," Internet Draft, pp. 1-15, Nov. 15, 1998.

Neilson, Rob, et al., "A Discussion of Bandwidth Broker Requirements for Internet2 Qbone Deployment," Internet2 Qbone BB Advisory Council, Version 0.7, pp. 1-30, Aug. 1999.

Stojsic, Goran, et al., "Formal Definition of SIP Proxy Behavior," IEEE, pp. 289-292, Feb. 2001.

Bhuyan, L., et al., "Impact of switch Design on the Application Performance of Cache-Coherent Multiprocessors,"Dept. of Computer Science, Texas A.and.M University and Intel Corp., pp. 1-9, Nov. 15, 2005.

Product Overview, "IP Highway product overview," http://iphighway.com/prod/, pp. 1-4, Sep. 22, 1999.

Rosenberg, Jonathan, et al., "Internet telephony gateway location," IEEE, pp. 488-496, Feb. 1998.

Wright, S., et al., "IP *Telephony*" vs. *ATM*: What is There to Discuss'?," IEEE, pp. 400-409, Feb. 1998.

Wedlund, Elin, et al., "Mobility support using SIP," WoWMoM, Jan. 1999.

Aiken, B., et al., "Network Policy and Services: A report of a Workshop on Middleware," Network Working Group, pp. 1-26, Feb. 2000.

Aspnes, James, et al., "On-Line Routing of Virtual Circuits willi Applications to Load Balancing and Machine Scheduling," pp. 486-504, Journal of the ACM, vol. 44, No. 3, May 1997.

Salsano, Stefano, et al., "QoS Control by Means of COPS to Support SIP-Based Applications," IEEE Network, Mar./Apr. 2007.

White, Paul P., "RSVP and Integrated Services in the Internet: A Tutorial," IEEE Communications Magazine, pp. 100-106, May 1997.

Beck, Christopher J., et al., "Scheduling alternative activities," http://www.aaai.org/home.html, 1999.

Flykt, P., et al., "SIP Services and Interworking IPv6," 3G Mobile Communication Technologies, 26-28 Mar. 2001, Conference Publication No. 477.

Schulzrinne, Henning, et al., "Signaling for internet telephony," Columbia University, Dept. of Computer Science Technical Report CUCS-005-98, Feb. 2, 1998.

Barzilai, Tsipora, et al., "Design and Implementation of an RSVP-based Quality of Service Architecture for Integrated Services Internet," IEEE, May 1997.

Hubaux, Jean-Pierre, et al., "The impact of the Internet on telecommunication architectures," Computer Networks 31 (1999).

Roberts, Erica, "The New Class System,"http://www.data.com/roundups/class_system.html, pp. 1-14, Sep. 22, 1999.

Wroclawski, J., "The Use of RSVP with IETF Integrated Services," ftp://ftp.isi.edu/in-notes/rfc2210.txt, Sep. 22, 1999.

Sloman, Morris, et al., "Distributed Management for the Networked Millennium," Proceedings of the Sixth IFIP/IEEE International Symposium on Integrated Network Management - Boston, MA, U.S.A., May 24-28, 1999.

Schulzrinne, Henning, "MIME-Version: 1.0," email communication dated Oct. 10, 1995.

Garrahan, James J., et al., "Marching toward the global intelligent network," IEEE Communications Magazine, vol. 31, No. 3, pp. 30-36, Mar. 1993.

Gys, L, et al., "Intelligence in the Network," Alcatel Telecommunications Review, pp. 13-22, 1st Quarter 1998.

Yang, C., "INETPhone Telephone Services and Servers on Internet," Network Working Group, pp. 1-6, Apr. 1995.

Perret, Stephane, et al., "MAP: Mobile Assistant Programming for Large Scale Communication Networks," IEEE, pp. 1128-1132, Apr. 1996.

Plunkett, Bill, "ISCP Service Capacity Improvements," Bellcore, Feb. 29, 1996.

Murray, Dave, "High speed signalling link interface for ISCP version 6.0," Bellcore, Feb. 29, 1996.

Evans, Jeff, "Alternative Approaches for Multi-ISCP Locator," Bell Atlantic, Mar. 13, 1996.

Performance Task Force, "Off-Line Engineering Tool," Bellcore, Sep. 3, 1996.

Jones, Doug R., "Advanced intelligent network delivering control of network routing," Bell Atlantic, downloaded, Aug. 20, 2008.

Gorton, Dave, "ISCP Evolution overview," Telcordia Technologies Inc., Jun. 5, 2001.

Brown, Kathryn C., "Telecom Convergence," PowerPoint presentation, downloaded Aug. 21, 2008.

Cohen, Danny, "Specifications for the Network Voice Protocol (NVP)," http://www.rfc-archive.org/getrfc.php?rfc=741, Nov. 22, 1977.

Low, Colin, "The Internet Telephony Red Herring," Hewlett Packard, pp. 1-15, May 15, 1996.

de la Fuente, La., et al., "Application of the TINA-C Management Architecture," Bellcore, Red Bank, NJ, downloaded, Aug. 21, 2008.

Finseth, C. "An access control protocol, sometimes called TACACS," Network Working Group, University of Minnesota, pp. 1-21, Jul. 1993.

Buchanan, Ken, et al., "IMT-2000: Service Provider's Perspective," IEEE Personal Communications, pp. 8-13, Aug. 1997.

Pontailler, Catherine, "TMN and New Network Architectures," IEEE Communications Magazine, pp. 84-88, Apr. 1993.

Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A Dec. 1993.

* cited by examiner

VOICE CALL ALTERNATIVE ROUTING THROUGH PSTN AND INTERNET NETWORKS

RELATED APPLICATIONS

This is a continuation of prior co-pending application Ser. No. 08/821,027, entitled "Voice Call Alternative Routing Through PSTN and Internet Networks," filed Mar. 19, 1997, now U.S. Pat. No. 6,870,827 which is incorporated herein by reference in its entirety. This application is related to application Ser. No. 08/634,544, entitled Universal Access Multimedia Network, filed Apr. 18, 1996 and issued Aug. 4, 1998 as U.S. Pat. No. 5,790,548, application Ser. No. 08/634,543, entitled Internet Telephone Service, filed Apr. 18, 1996 and issued Aug. 20, 2002 as U.S. Pat. No. 6,438,218, and application Ser. No. 08/670,908, entitled Internet Telephone System, filed Jun. 28, 1996 and issued May 30, 2000 as U.S. Pat. No. 6,069,890. The specifications of those applications are incorporated herein by reference in their entirety.

TECHNICAL FIELD

The present invention relates to telecommunications networks and more particularly to transporting voice calls alternatively through an Internet path or the public switched telephone network (PSTN) in dependence upon Internet service quality.

BACKGROUND OF INVENTION

Implementation of voice telephone service over a worldwide data network, such as the Internet, offers advantages that are now being explored. The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust. In effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries.

A simplified diagram of the Internet is depicted in FIG. 1. Generally speaking the Internet 50 consists of Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems (ASs) are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, Sprint is an ISP, and MicroSoft (MSN) is an IP using UUNET as an ISP. Other information providers, such as universities, are indicated in exemplary fashion at 72 and are connected to the AS/ISPs via the same type connections, here illustrated as T1 lines 74. Corporate Local Area Networks (LANs), such as those illustrated in 76 and 78, are connected through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The Information Providers (IPs) are end systems that collect and market the information through their own servers. Access providers are companies such as UUNET, PSI, MCI and SPRINT which transport the information. Such companies market the usage of their networks.

In simplified fashion the Internet may be viewed as a series of gateway routers connected together with computers connected to the routers. In the addressing scheme of the Internet an address comprises four numbers separated by dots. An example would be 164.109.211.237. Each machine on the Internet has a unique number that includes one of these four numbers. In the address, the leftmost number is the highest number. By analogy this would correspond to the ZIP code in a mailing address. The first two numbers that constitute this portion of the address may indicate a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This process continues until the packet arrives at the destination computer. The separate packets that constitute a message may not travel the same path, depending on traffic load. However, they all reach the same destination and are assembled in their original order in a connectionless fashion. This is in contrast to connection oriented modes such as frame relay and ATM or voice.

Software has recently been developed for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers. The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. Nos. 5,434,913, issued Jul. 18, 1995, and 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

The commonly assigned application Ser. Nos. 08/634,543 and 08/670,908, identified more particularly above, are concerned with providing telephone service via the Internet to users of the public telecommunications network who may not have access to a computer or separate telephone access to the Internet. Such service would be economical, especially for long distance calls, compared with the toll rates charged by long distance interexchange carriers.

With increasing volume of use on the Internet and the bursty nature of data transmission, traffic patterns have become unstable and unpredictable. The minimum quality of service acceptable for voice communication is much higher than the level for data transport as transmission delays noticeably degrade conversation. With the Internet or other high volume data network, acceptable voice communication may be available between two end points at a given time, but often not at other times. A surge in data traffic may make the network unsuitable for voice communication for as much as twenty or thirty minutes. Bottlenecks may occur at different points in the network at different times. The locations of the participants of a voice call are factors in determining suitability of the data network. The degree to which degradation of a voice call remains acceptable is subjective with the user and can be a tradeoff between quality of service and reduction of cost.

A deficiency in earlier proposed voice Internet service systems is the inability to ensure an acceptable level of service quality. The data packet network traffic in the connection paths of a voice call may render intolerable transmission delays. Current systems do not measure delays against user acceptable standards. The voice call user must either endure such a call or terminate the call in favor of originating a new call through an alternative system.

BRIEF SUMMARY OF THE INVENTION

The present invention overcomes the above noted drawbacks of earlier proposed systems and provides additional advantages in part by utilizing the advanced intelligent network (AIN) to determine routing of voice calls alternatively between the public switched telephone network (PSTN) and a data packet network, such as the Internet, in accordance with the quality of service existing in the data packet network at the times of call origination. The user's acceptable level of service may be predefined with a threshold quality level stored in the user's Call Processing Record (CPR) in the AIN Integrated Services Control Point (ISCP) On a per call basis, the caller linked to a first public switched network may indicate a preference to route through the Internet. This indication is recognized by the AIN system, in response to which the quality of service currently present on the Internet for completion of the call is measured. If the result exceeds the stored threshold, the call is setup and routed through the Internet to the switched network link to the destination party. If the quality of service on the Internet is not satisfactory, the call is alternatively routed through the PSTN, which may include an Interexchange Carrier link. The AIN system automatically controls the alternative routing of such calls. The Interexchange Carrier selection may be made in accordance with a carrier identified in the calling subscriber's CPR or the ISCP may determine routing through a default carrier in accordance with a global routing scheme.

The invention thus provides the advantages of enabling a caller to indicate, individually for each call, a preference for that call to be routed through a packet data network if the performance of that network is currently acceptable. If not, routing of the call is made through the PSTN in normal fashion. The route actually undertaken in this process is transparent and undetectable to the caller at the time of the call.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 2:
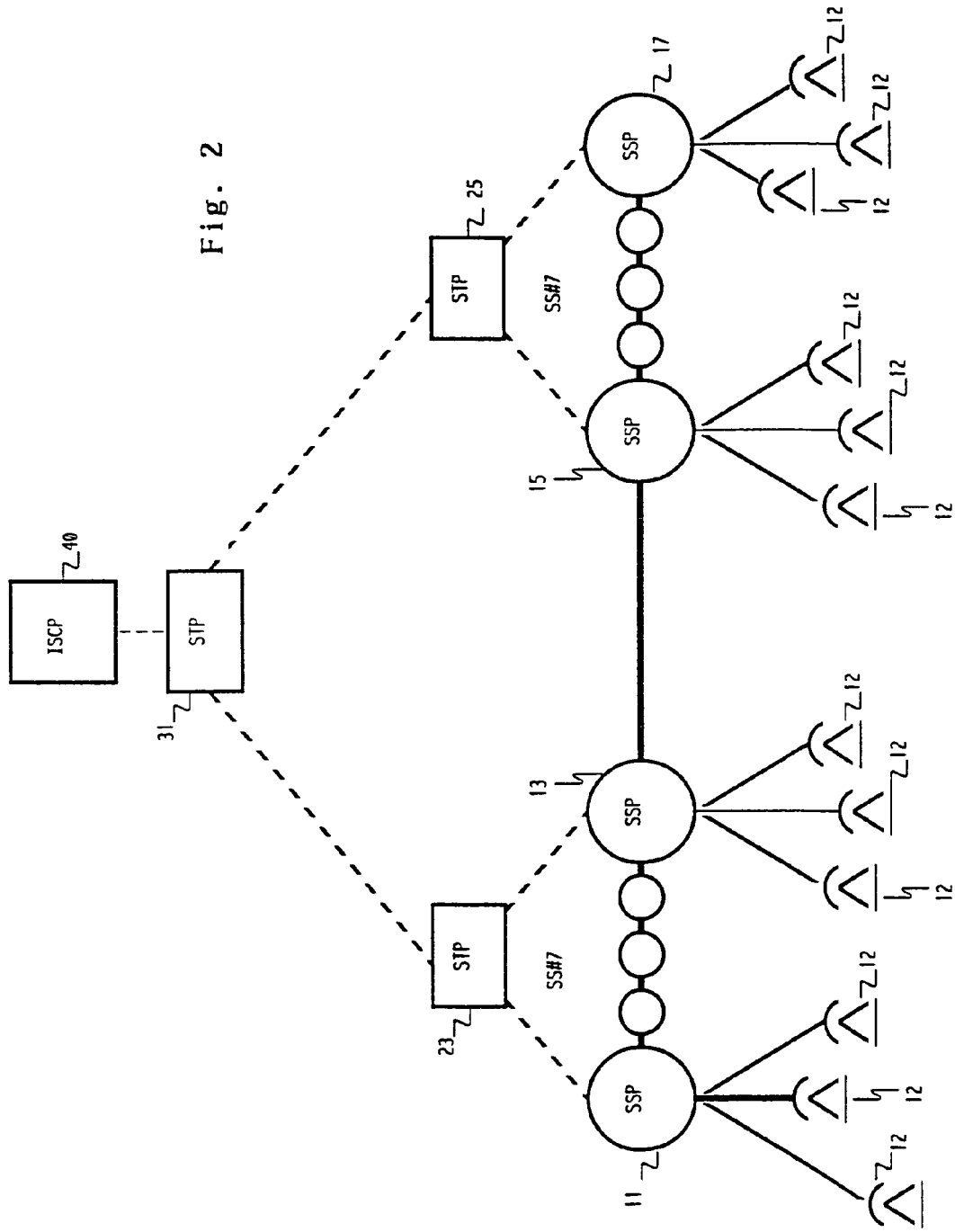
FIG. 2 is a simplified block diagram of a Public Switched Telephone Network (PSTN) that comprises a Common Channel Interoffice Signaling (CCIS) system and voice communication network that perform as an Advanced Intelligent Network (AIN) system.

FIG. 2 is a depiction of the AIN architectural environment that is considerably simplified for explanation purposes. The full network and operating environment for the invention may comprise multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application Ser. No. 08/248,980, filed May 25, 1994, hereby incorporated by reference herein.

The SSP type COs 11 and 13 are shown connected to a first local area STP 23, SSP-COs 15 and 17 being connected to a second local area STP 25. The connections to the STPs are for signalling purposes. The control part of SS7 protocol is known as Integrated Services Digital Network User Part (ISUP). ISUP determines the procedures for setting up, coordinating, and taking down trunk calls on the SS7 network.

Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only.

The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the aforementioned copending application Ser. No. 08/248,980, filed May 25, 1994, for a more detailed description of the AIN network.

The ISCP 40 is an integrated system shown that contains a data base. In the AIN network system, certain calls receive specialized AIN type processing under control of data files stored in the ISCP data base. Such files contain call processing records (CPRs) associated with respective AIN subscribers. Information contained in the CPRs relate to the AIN service or services to which the customer subscribes. The SSP type local offices of the public telephone network include appropriate data in their translation tables for customers subscribing to AIN services to define certain call processing events identified as AIN "triggers". The SSP uses the translation table data to detect a triggering event during processing of calls to or from such AIN service subscribers. Upon detection of such event, the SSP suspends processing of a call and activates a query and response type AIN interaction with the ISCP. Completion of call processing ensues after sufficient information is exchanged between the SSP and the ISCP. For ordinary telephone service calls that are not subject to enhanced treatment, there would be no event to trigger AIN messaging. The local and toll office switches would function normally and process such calls without referring to the SCP data base for instructions.

Figure 3:
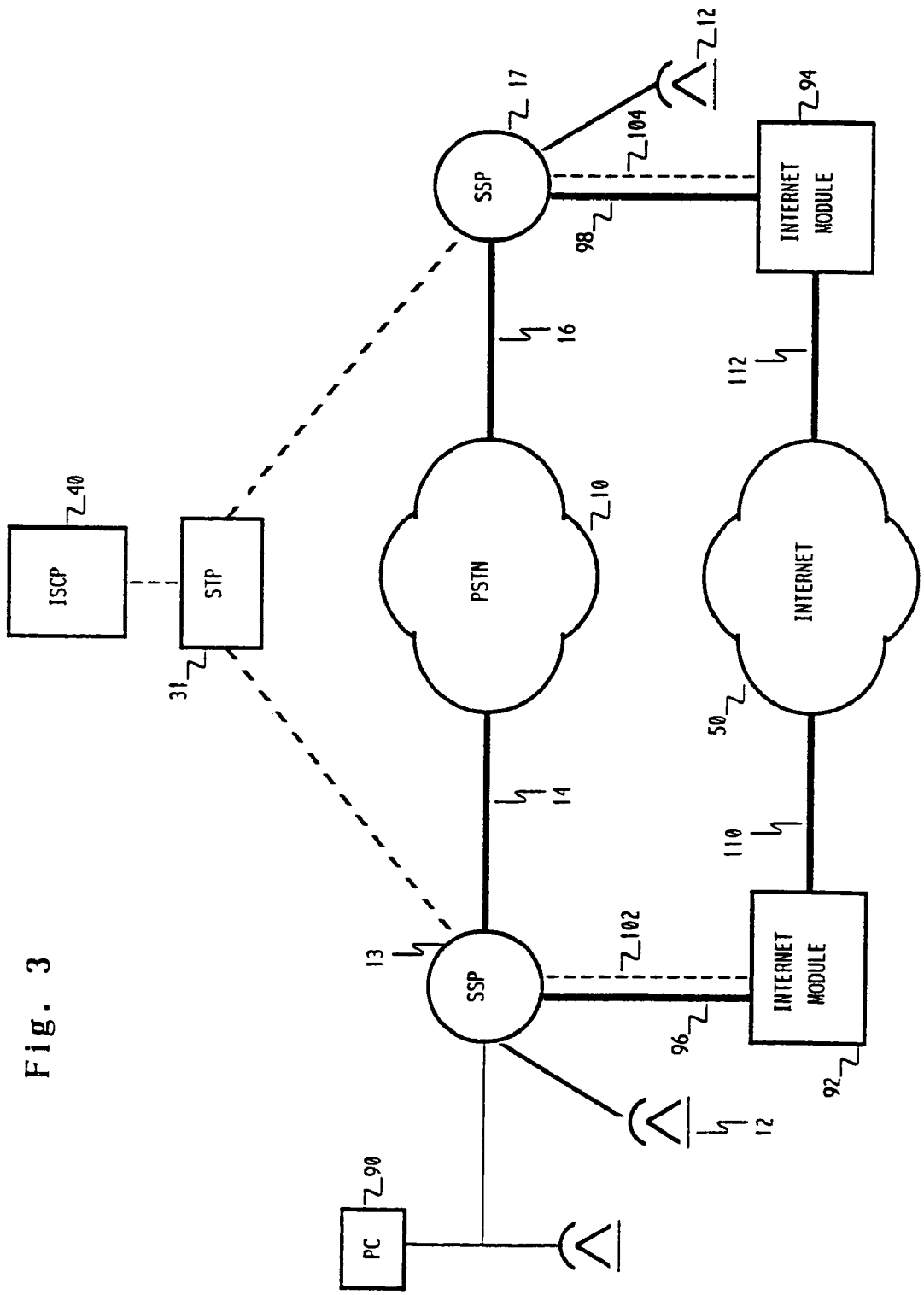
FIG. 3 is a simplified block diagram of an AIN controlled PSTN, such as the type shown in FIG. 2, which includes architecture for implementing Internet routing in accordance with one preferred embodiment of the invention.

FIG. 3 is a simplified block diagram of an AIN controlled PSTN, such as the type shown in FIG. 2, which includes architecture for implementing Internet routing in accordance with one preferred embodiment of the invention. It is to be understood that the Internet representation in this figure, as well as throughout this disclosure, is illustrative of any packet network of routers that allows voice traffic to be packetized and sent over a shared network. The use of the phrases "Internet" and "data packet network" or the like are used interchangeably throughout this description. In FIG. 3, wherein like reference numerals are used for corresponding elements of all other figures, there are shown two SSP capable central offices 13 and 17 which may be located in the same or different states and regions. These central offices are connected by trunks 14 and 16 respectively to the PSTN indicated by a cloud 10. Each central office is connected by local loops to subscribers customer premises equipment (CPE) such as telephone terminals 12 and PC 90. The telephone 12 may be a standard telephone used for Plain Old Telephone Service (POTS), with conversion of analog voice to digital signals performed at a central office, or a so-called "Internet Phone" that outputs digital voice signals. The SSPs 13 and 17 are connected by CCIS links to STP 31 which in turn may be connected to ISCP 40. While the STP functionality is here shown as constituting a single STP it will be appreciated that this is for the purpose of simplicity only and that a hierarchy of STPs may be involved.

Each of the central office SSPs 13 and 17 is connected to Internet Module 92 and 94, respectively, by T1 trunks 96 and 98. Alternatively, the Internet Module hardware may be situated at the central office and associated with the switching system. The Internet Module will be described in further detail with respect to FIG. 4. The Internet Modules may be provided with SSP capabilities and connected into the CCIS network directly to an STP or, as illustrated by the links 102 and 104, to the SSPs 13 and 17. The Internet Modules may be linked together for signaling purposes by conventional F links. The Internet Modules are connected to the Internet cloud by T1/T3 trunks 110 and 112.

Figure 1:
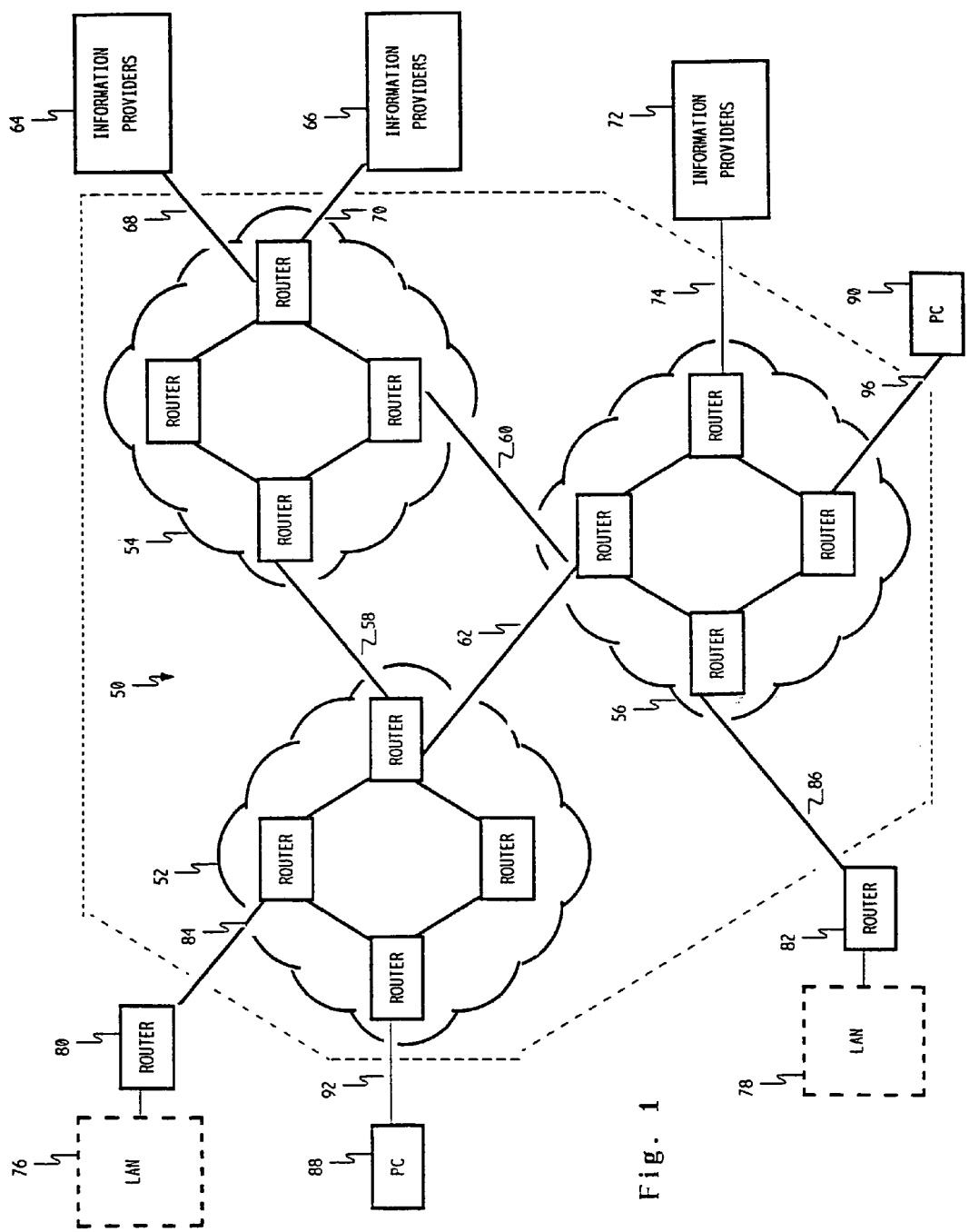
FIG. 1 is a simplified diagram of the Internet.
Figure 4:
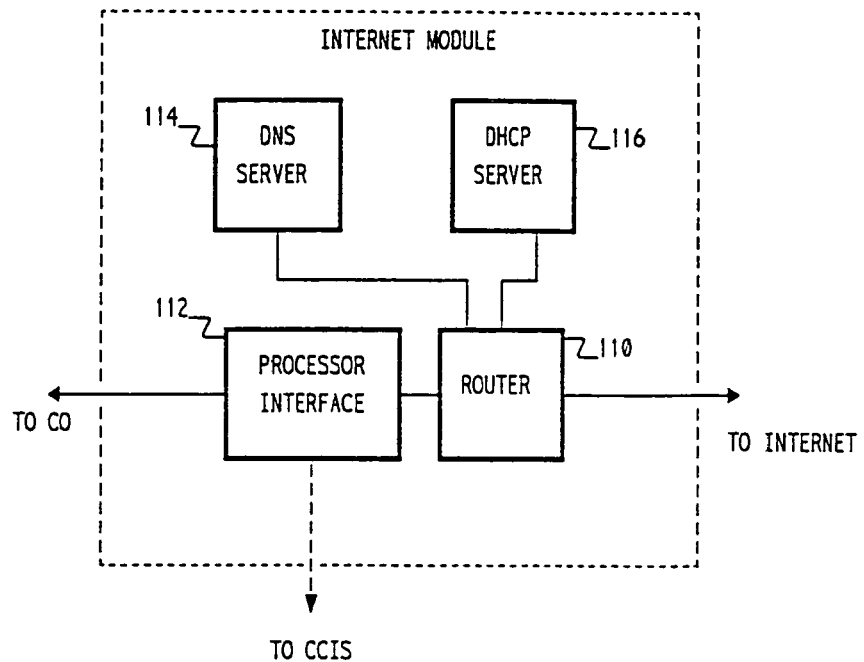
FIG. 4 is a diagram of the functional architecture of one embodiment of an Internet Module for use in the system and method of the invention.

The functional architecture of one embodiment of an Internet Module for use in the invention is shown diagrammatically in FIG. 4. The Internet Module includes a router 110 of the type now generally used in Internet practice, such as shown in FIG. 1 and described in related application Ser. No. 08/634,544, referenced above. An interface with processing capability is illustratively shown at 112. Connected to the router are a Domain Name Service (DNS) server 114 and a Dynamic Host Configuration Protocol (DHCP) server 116 of the type conventionally used by Internet Service Providers in existing Internet Service. The router interface is connected to the central office and to the CCIS network while the router is connected to the Internet.

Figure 5:
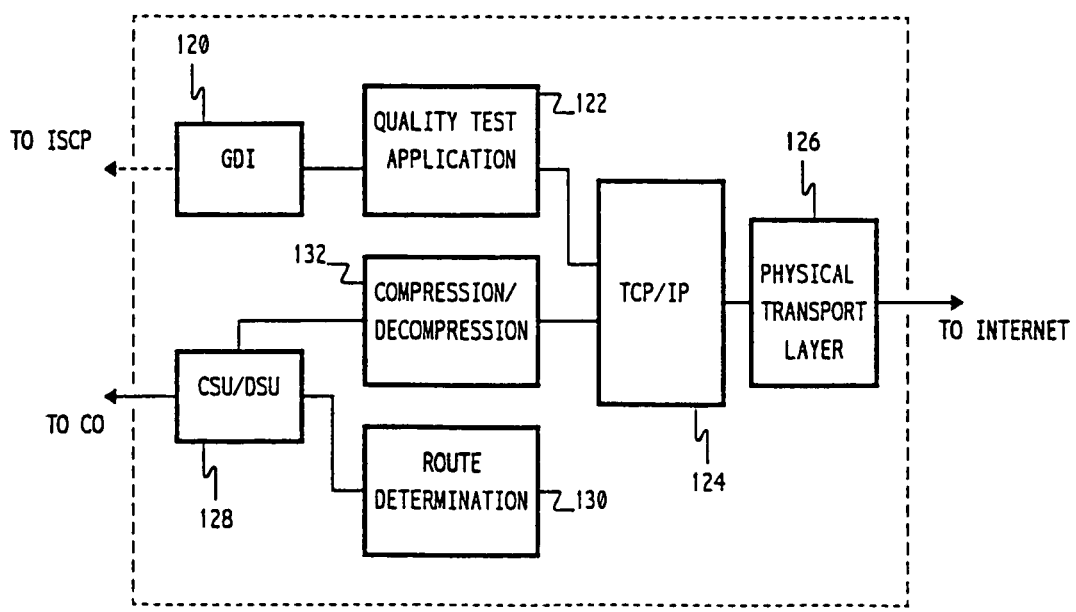
FIG. 5 is a block diagram that represents the functionality of the processor interface 112 and the router 110 shown in FIG. 4.

FIG. 5 is a block diagram that represents the functionality of the processor interface 112 and the router 110. The processor contains a common Generic Data Interface (GDI) 120 for communicating signaling messages with the ISCP in the telephone network. Upon prompt from the ISCP, through the GDI, a quality test application in the processor can be initiated for determining whether a call is to be routed through the Internet. Data communication by the gateway router of both signaling and information content through the Internet (or other equivalent packet network) occurs through TCP/IP protocol 124, packets being transmitted and received through physical transport layer 126. The physical transport layer may comprise Asynchronous Transfer Mode (ATM), frame relay or some other type of data communication mode.

While message and signaling communication with the ISCP occurs through the GDI, communication of voice data is made through the Channel Serving Unit, Digital Serving Unit (CSU/DSU) 128. This unit, which may physically comprise a digital line card in the processor with standard 24 digital voice line inputs, packetizes voice data received from the telephone central office. The CSU/DSU performs line coding, line-conditioning and equalization functions, and responds to loopback commands from the central office. Including functions similar to a modem, the CSU/DSU can pass data at a range greater than 56 Kbps. The CSU/DSU coordinates with route determination unit 130 to identify packets, termination phone numbers and routes to the network termination gateway router. The route determination information is included in each packet for the data received from the originating central office SSP. The packetized data is compressed in accordance with stored algorithm 132, before being sent to the TCP/IP stack and physical transport layer for transmission to the far end gateway router. To complete transmission to the destination telephone, the termination router decompresses the received packets, depacketizes back to voice data which is then routed to the destination PSTN. Two way capability for each of the functions is provided for communication in both directions. While shown for illustrative purposes as separate blocks, the route determination and compression/decompression functions, as well as the quality test application, may be run, for example, by a UNIX-based computer.

Figure 6A:
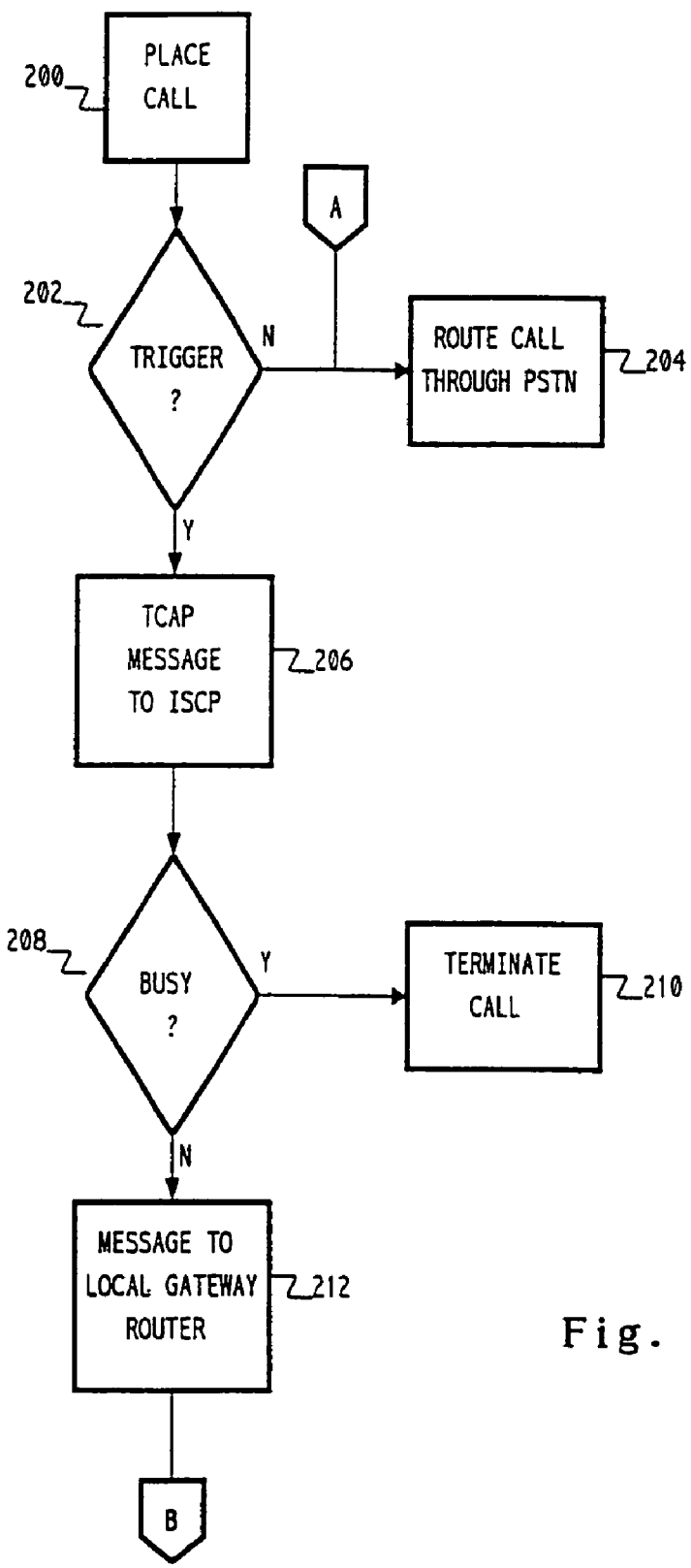
FIGS. 6A and 6B taken together form a simplified flow chart that illustrates operation of preferred embodiments of the invention in which service is provided on a per call basis.
Figure 6B:
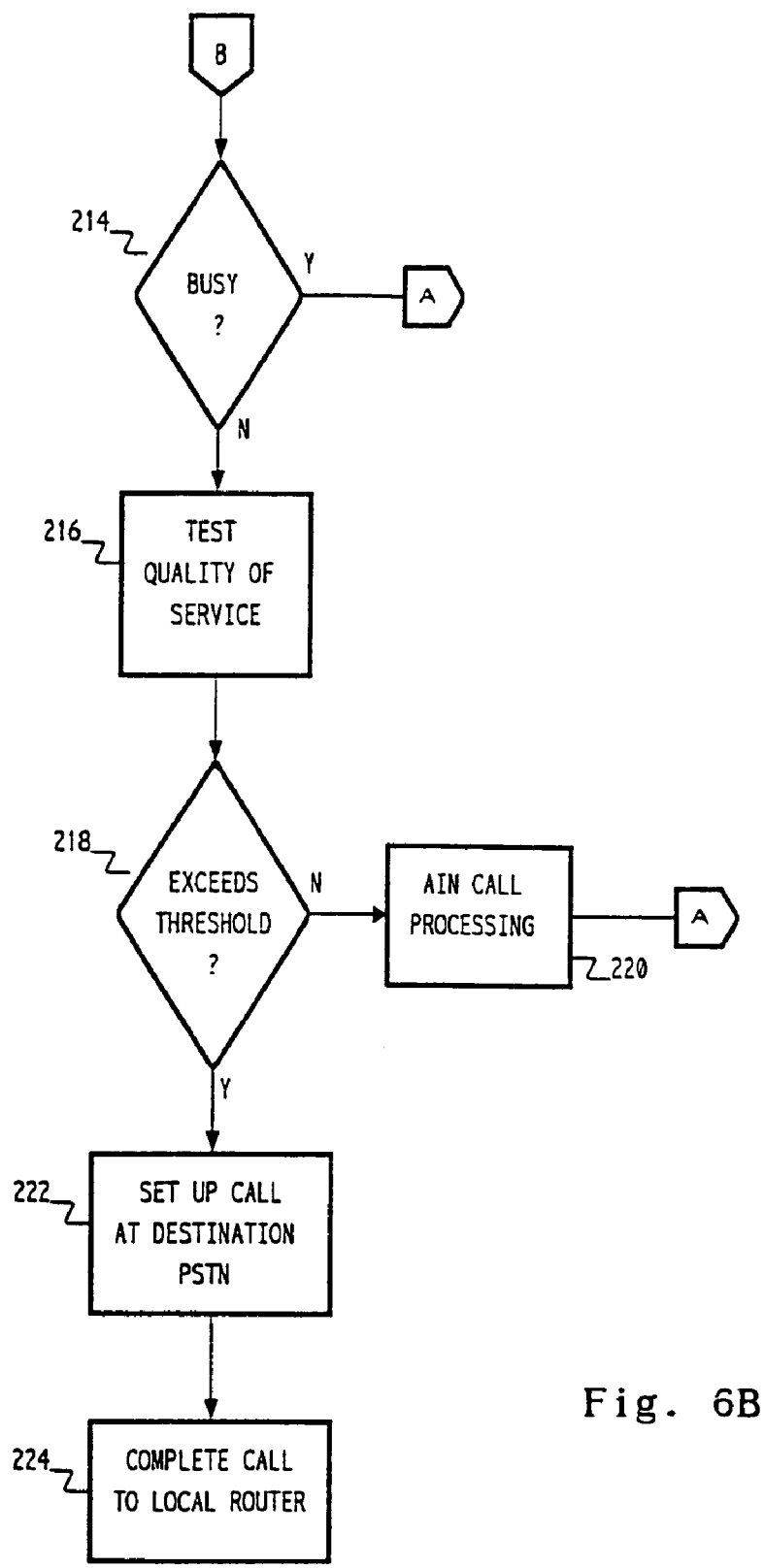

FIGS. 6A and 6B taken together form a simplified flow chart illustrating operation of a preferred embodiment of the invention. At step 200 a call is placed by a subscriber. The service is envisioned as affording flexibility through which a caller may be given the Internet option on either a per call basis or a predefined basis. In the predefined basis embodiment, the subscriber's CPR in the ISCP will contain preselected conditions for which routing through the Internet will occur, subject to acceptable quality of service in the network at the time of a call. Such preselected conditions can include any combination of time of day, day of week, destination areas, or specific destination telephone numbers. Of course, the CPR may be set to attempt Internet routing for all interlata calls if so desired.

In the per call basis embodiment, illustrated by FIG. 6A, the Internet routing attempt is made only for calls in which a preestablished prefix service code is entered by the caller. Such code may be, for example, *82 that is entered by DTMF before the dialed telephone number. Of course, other arrangements can be provided for a caller to seek Internet routing on a per call basis, for example, by placing a call to a specified virtual telephone number or through an operator.

At step 202 a determination is made at the caller's central office SSP whether to trigger a TCAP message to the AIN ISCP, whereupon processing of routing for the call is temporarily suspended. Triggering will occur in response to entry of the service code. This may be followed immediately by the dialed telephone number or a dial tone may be returned to the caller after the trigger for subsequent entry of the dialed telephone number. Alternatively, triggering can be initiated by calling a virtual number or an operator, after which the destination telephone number is input.

If a trigger has not been detected at step 202, the call is routed in normal fashion through the PSTN network at step 204. If a trigger has been detected, the originating central office SSP formulates a TCAP query message to the ISCP at step 206. The ISCP will recognize from the caller's CPR that the call is to be placed through the Internet (or equivalent data network) if the quality of service in that network meets an acceptable threshold level identified in the CPR of the calling party.

Before proceeding further, the ISCP determines through the SS7 signaling network, at step 208, whether the call destination station is busy. If so, the call is terminated with a busy signal transmitted to the calling party at step 210. As an alternative to the SS7 network determination, busy/non-busy status at the destination station can be determined through the Internet. In this alternative, the ISCP can signal the GDI interface of the local router to route through to the destination router interface to the destination PSTN for the inquiry.

If the destination station is not busy, the ISCP will send a message to the local gateway router to perform a quality of service test at step 212. If the local gateway GDI interface is unable to accept the message or the CSU/DSU unit of the router is fully occupied, as determined at step 214, the ISCP will instruct the originating SSP to complete the call through the PSTN at step 204. If the local gateway router is available, as determined at step 214, the GDI initiates the quality test application at step 216.

The performance of the quality of service test may comprise the sending of one or more data packets, known in the art as a "PING" signal, from the local router to the destination router and measuring the response time. PING, which is an acronym for Packet InterNet Groper, is a program used to test reachability of destinations by sending them an Internet Control Message Protocol (ICMP) echo packet request and waiting for a reply. The test packet signal generated by the quality test application is formatted for transport through physical layer 126 and the Internet to the destination end gateway router. As a more sophisticated alternative, the test application can format a sample packet with RSVP protocol that includes a bandwidth reservation for all routers that will transmit the call through the network. A measure of PING performance quality is the time delay taken for the signal to traverse the circuit, and variance of such delays in successive test transmissions. In the case of bandwidth reservation, an acknowledgement back from the destination that a specified minimum bandwidth level has been reserved is a measure of performance quality.

From the response back from the destination router, the test application obtains a quality of service level that is signaled back to the ISCP. This level is compared with an acceptable threshold level stored in the caller's CPR at step 218. If the level is not up to the acceptable level of quality, routing of the call is controlled by the AIN, which will terminate any data network activity for the call at step 220 and handle call routing as in step 204.

If it is determined at step 218 that the quality of service in the data network is acceptable, the ISCP will signal the local router, at step 220, to transmit a message to the destination router to initiate a call through the destination PSTN to the destination station. The path for transmission of the voice data through the data network will have been determined by the CSU/DSU unit 128, in conjunction with route destination unit 130, either when bandwidth had been reserved or, in the case of acceptable PING test result, in response to the ISCP signal received in step 218. The ISCP, at step 222, will send a TCAP message to the originating central office SSP to complete the call to the local router CSU/DSU port allocated for the call. Outgoing voice signals received by the CSU/DSU from the originating location will be compressed by unit 132, formatted using TCP/IP protocol and physically transported over the data packet network. Incoming packeted voice signals will be decompressed for transmission through the local PSTN to the origination location.

Figure 7:
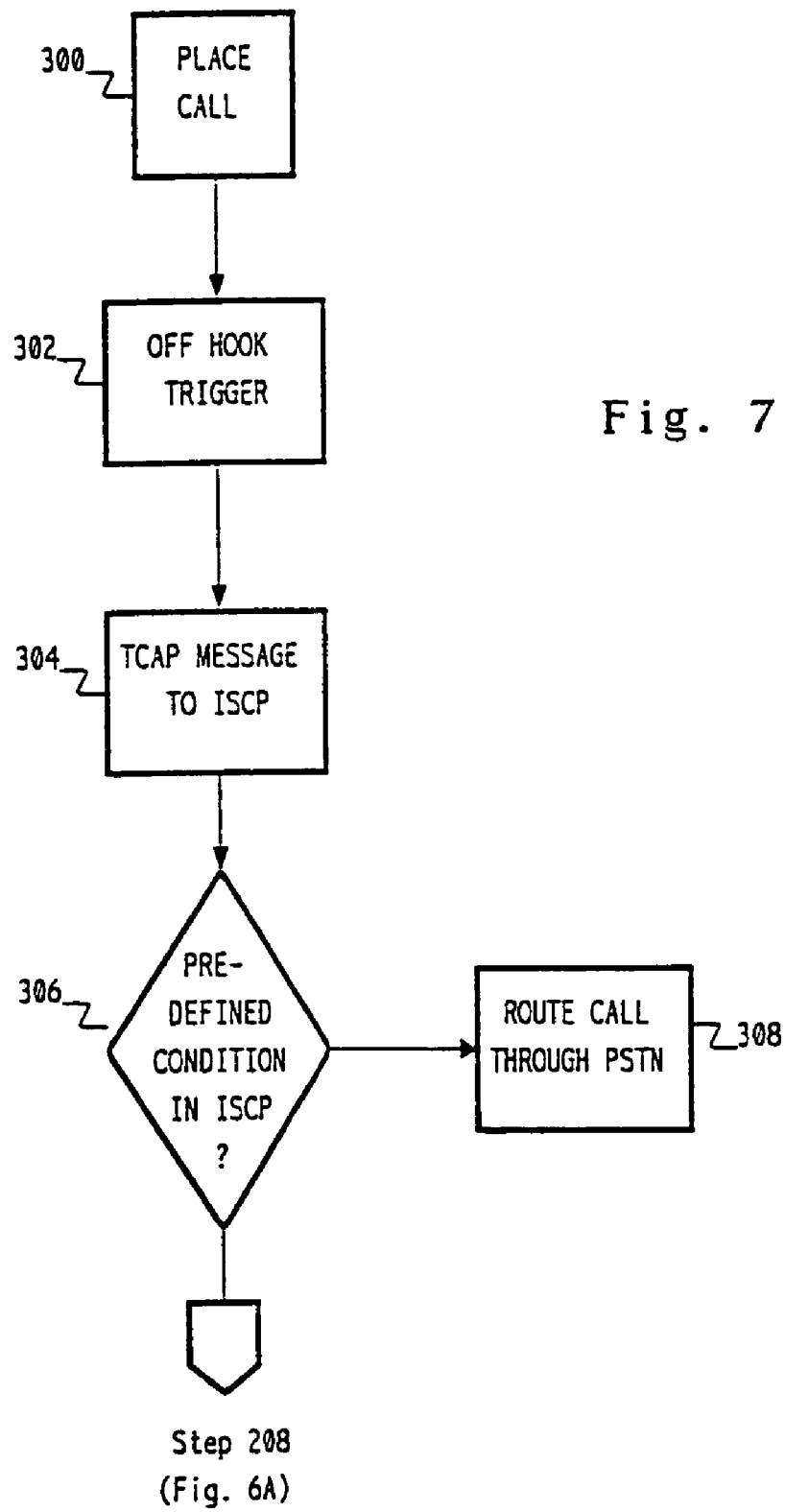
FIG. 7 is a partial simplified flow diagram for the preferred embodiment of the invention in which service is provided on a predefined basis.

FIG. 7 is a partial simplified flow diagram for the preferred embodiment of the invention in which service is provided on a predefined basis. This figure illustrates only steps in which the call processing flow varies from the operation flow of the embodiment of FIGS. 6A and 6B. Thereafter, the embodiment proceeds to step 208 of FIG. 6A. That is, for this embodiment the steps 200 through 204 are replaced with the steps shown in FIG. 7. Placement of a call by a subscriber at step 300 initiates an off-hook trigger at the associated central office, step 302. The central office, in turn, suspends processing of call routing to formulate a TCAP message, transmitted to the ISCP at step 304. At step 306, the ISCP determines whether the information received in the TCAP message matches a predefined condition stored in the CPR of the calling subscriber. As indicated above, the CPR may contain a list of destination telephone numbers, area codes, times of day or week, or any combination of such criteria by which an attempt to rout a call through the Internet is to be attempted. Other criteria such as considered desirable by a subscriber can also be included.

If no predefined condition stored in the CPR has been recognized to identify the call as an Internet call in step 306, the call will be routed in normal fashion through the PSTN at step 308. If an Internet routing attempt is indicated at step 306, the process continues in accordance with FIGS. 6A and 6B at step 208 and the steps thereafter.

It can be appreciated that the use of the AIN network to control routing of telephone calls alternatively through the PSTN or Internet in accordance with this invention will ensure quality of voice communication while taking advantage of available network economies. While the per call basis and predefined basis services have been described above as separate embodiments for simplicity of explanation, these services can be combined into a single service. A subscriber thus can be given the option for any given call to expand the predefined conditions stored in the subscriber CPR, destinations and time of day listings for examples, by inputting a code, such as *82. The ISCP would be triggered in response to such input and programmed to ignore certain stored conditions in the CPR for the current call, while controlling routing in compliance with indicated acceptable quality levels.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein. For example, ISCP determination of whether routing may be made through the data network may be made in response to triggering initiated at an SSP other than the calling party originating SSP. The SSP 13 of FIG. 3 instead may be an intermediate SSP at the point of presence (POP) of an interexchange carrier that is linked to the originating caller SSP. The selection field in the SS7 ISUP message received by the SSP at the POP would indicate that routing through Internet is preferred if the quality of service in that network is acceptable. The use of the intelligent network to route the call to completion at that point is then under control of the interexchange carrier. As a further alternative, a dedicated trunk can be connected to the interexchange carrier SSP for all such calls.

We claim:

1. A method, comprising:

receiving a request to place a voice telephone call from a first station that is a point of origination for the call to a second station that is a point of termination for the call, the first and second stations being remotely located from each other;

determining a quality of service of a data packet network located between the first station and the second station;

comparing the quality of service obtained in said determining with a predetermined threshold level for the voice telephone call, the predetermined threshold level stored in a database associated with the first station;

in response to a result of said comparing that said predetermined threshold level is exceeded, routing the voice telephone call between the first station and the second station through the data packet network in packet data format; and in response to a result of said comparing that the predetermined threshold level is not exceeded, transparently routing the voice telephone call between the first station and the second station through a circuit switched voice network located between the first station and the second station;

wherein the first station is connected to a first switch, the first switch is connected to a first internet module and the circuit switched network, and the first internet module is connected to the data packet network, such that the voice telephone call is capable of being communicated between the first station and the second station (i) through the first internet module and first switch when routed through the data packet network, or (ii) through the first switch when routed through the circuit switched network.

2. The method of claim 1, wherein the second station comprises an Internet phone capable of outputting digital voice signals.

3. The method of claim 1, wherein the switch is a service switching point (SSP) located in a central office (CO) of a public switched telephone network (PSTN).

4. The method of claim 1, wherein the routing of the voice telephone call between the first station and the second station through the data packet network include packetizing voice data of the voice telephone call, compressing the packetized voice data, and transmitting the compressed packetized voice data.

5. The method of claim 4, wherein the routing of the voice telephone call between the first station and the second station through the data packet network further includes determining route information associated with the second station, and including in each packet the route information.

6. The method of claim 1, wherein the predetermined threshold level is stored in a call processing record associated with the first station in the database associated with the first station, wherein the call processing record includes information regarding services subscribed to by the customer and conditions under which specific routing will occur.

7. The method of claim 1, wherein the database is in an integrated services control point (ISCP).

8. The method of claim 7, wherein the switch is a service switching point (S SP) located in a central office (CO) of a public switched telephone network (PSTN), and wherein the receiving of the request to place the voice telephone call from the first station to the second station comprises receiving a message from the integrated services control point indicating the request.

9. A method, comprising:
receiving a request to connect a voice telephone call from a first station that is a point of origination for the call to a second station that is a point of termination for the call, the first and second stations being remotely located from each other;
determining a quality of service of a packet switched network located between the first station and the second station;
comparing the quality of service obtained in said determining with a predetermined threshold level for the voice telephone call, the predetermined threshold level stored in a database associated with the second station,
in response to a result of said comparing that the predetermined threshold level is exceeded, routing the voice telephone call between the first station and the second station through the packet switched network in packet data format; and
in response to a result of said comparing that the predetermined threshold level is not exceeded, transparently routing the voice telephone call between the first station and the second station through a circuit switched voice network located between the first station and the second station;

wherein the second station is connected to a second switch, the second switch is connected to a second internet module and the circuit switched network, and the second internet module is connected to the packet switched network, such that the voice telephone call is capable of being communicated between the first station and the second station (i) through the second internet module and second switch when routed through the packet switched network, or (ii) through the second switch when routed through the circuit switched network.

10. The method of claim 9, wherein the first station comprises an Internet phone capable of outputting digital voice signals.

11. The method of claim 9, wherein the second switch is a service switching point (SSP) located in a central office (CO) of a PSTN.

12. The method of claim 9, wherein the routing of the voice telephone call between the first station and the second station through the packet switched network includes packetizing voice data of the voice telephone call, compressing the packetized voice data, and transmitting the compressed packetized voice data over the packet switched network.

13. The method of claim 12, wherein the routing of the voice telephone call between the first station and the second station through the packet switched network further comprises determining route information associated with the first station, and including in each packet the route information.

14. The method of claim 9, wherein the first station is connected to a first switch, the first switch is connected to a first internet module and the circuit switched network, and the first internet module is connected to the packet switched network, such that the voice telephone call is capable of being communicated between the first station and the second station (i) through the first internet module and first switch when routed through the packet switched network, or (ii) through the first switch when routed through the circuit switched network.

15. The method of claim 9, wherein the predetermined threshold level is stored in a call processing record associated with the second station in the database associated with the second station, wherein the call processing record includes information regarding services subscribed to by the customer and conditions under which specific routing will occur.

16. A system, comprising:
an interface to a circuit switched network configured to receive and transmit information associated with a voice telephone call between a first station that is a point of origination for the call and a second station that is a point of termination for the call in a circuit-switched network format;
an interface to a packet switched network configured to receive and transmit information associated with the voice telephone call in a packet-switched network format;
an interface to the first station configured to receive from and transmit to the first station the information associated with the voice telephone call;
a processor interface including a quality test application configured to compare a quality of service of the packet switched network to a predetermined threshold level, the predetermined threshold level being stored in a database associated with one of the first station and the second station;
wherein the information associated with the telephone call is transmitted and received through the interface to the packet switched network when the quality of service of the packet switched network is above the predetermined threshold level, and the information associated with the telephone call is transmitted and received through the interface to the circuit switched network when the quality of service of the packet switched network is below the predetermined threshold level.

17. The system of claim 16, wherein the interface to the packet switched network includes:

a compression/decompression unit configured to compress packetized voice data for transmission and decompress received packetized voice data;

a route determination unit configured to identify telephone numbers and routes to a terminating network router associated with the second station; and a transfer control protocol/internet protocol (TCP/IP) unit configured to transmit and receive the packetized voice data via the packet switched network.

18. The system of claim 16, wherein the interface to the circuit switched network includes: includes a service switching point (SSP).

* * * * *